United States Patent [19]
Thomsen

[11] Patent Number: 6,128,580
[45] Date of Patent: Oct. 3, 2000

[54] CONVERTED-WAVE PROCESSING IN MANY-LAYERED ANISOTROPIC MEDIA

[75] Inventor: Leon Thomsen, Houston, Tex.

[73] Assignee: BP Amoco Corporation, Chicago, Ill.

[21] Appl. No.: 09/287,933

[22] Filed: Apr. 7, 1999

Related U.S. Application Data

[60] Provisional application No. 60/082,251, Apr. 17, 1998.

[51] Int. Cl.[7] ............................................ G01V 1/28
[52] U.S. Cl. ............................................................ 702/18
[58] Field of Search ................................. 702/18, 17, 14; 367/74, 75, 72, 73, 38

[56] References Cited

U.S. PATENT DOCUMENTS

| | | |
|---|---|---|
| 4,596,005 | 6/1986 | Frasier . |
| 4,597,066 | 6/1986 | Frasier . |
| 4,611,311 | 9/1986 | Frasier . |
| 4,839,869 | 6/1989 | Corcoran . |
| 4,881,209 | 11/1989 | Bloomquist et al. . |
| 4,918,670 | 4/1990 | Wang . |
| 5,307,268 | 4/1994 | Wang et al. . |
| 5,343,441 | 8/1994 | Alford . |
| 5,610,875 | 3/1997 | Gaiser . |

FOREIGN PATENT DOCUMENTS 2 196 122  4/1988  United Kingdom .

OTHER PUBLICATIONS

Alkhalifah, Tariq and Ilya Tsvankin. "Velocity Analysis for Transversely Isotropic Media." *Geophysics*. vol. 60, No. 5, Sep.–Oct. 1995; pp. 1550–1566.

Carr, B.J., S.B. Smithson and W.P. Iverson. "The Use of P–S Mode Conversions to Identify Fracture Anisotropy from Offset Vertical Seismic Profiles" Agu et al Spring Mtg (Montreal, Can. 92.05.12–16) Pap No. S61B–3; EOS, V 73, N 14 (Suppl), P 214, 92.04.07.

Cary, P.W. "P–S Wave Conversion Triples Survey Data." *Amer Oil Gas Reporter*. vol. 38, No. 7, Jul. 1995, pp. 75, 78–79.

Cary, P.W. "A Strategy for Layer–Stripping 3–D Converted–Wave Data" 65th Annu Seg Int Mtg (Houston, 95.10.08–13) Expanded Tech Program Abstr Biogr PP 356–369, 1995 (Pap No. In3 7).

Claerbout, Jon and Joe Dellinger. "Eisner's Reciprocity Paradox and Its Resolution." *Geophysics*. Oct. 1987, pp. 34–37.

Chung, W.Y. and D. Corrigan. "Gathering Mode–Converted Shear Waves: A Model Study." *SEG Expand Abstracts*. vol. 55, 1985, pp. 602–604.

Dellinger, Joe, Francis Muir and Martin Karrenbach. "Anelliptic Approximations for TI Media." *Journal of Seismic Exploration*. vol. 2, 1993, pp. 23–40.

Digranes, P. and Y. Kristoffersen. "Use of Mode–Converted Waves in Marine Seismic Data to Investigate the Lithology of the Sub–Bottom Sediments in Isfjorden, Svalbard." *PAGEOPH*. vol. 145, No. 2, 1995, pp. 313–325.

(List continued on next page.)

Primary Examiner—Donald E. McElheny, Jr.
Attorney, Agent, or Firm—James A. Gabala

[57] ABSTRACT

The instant invention provides a method for processing converted-wave data into interpretable images using a compact two-parameter model. The method broadly comprises the steps of: collecting both P-wave and converted-wave seismic data; identifying the arrival times of the P-wave and the converted-wave data; computing the vertical velocity ratio from the arrival time data; computing the moveout velocity ratio from the corresponding moveout velocities; computing the effective velocity ratio from the vertical velocity ratio and the moveout velocity ratio; and computing the conversion point from the short-spread P-wave moveout velocity for each reflector, from the effective velocity ratio, the C-wave moveout velocity ratio, and from the arrival time data.

35 Claims, 14 Drawing Sheets

OTHER PUBLICATIONS

Eaton, D.W.S., R.T. Slotboom, R.R. Stewart and D.C. Lawton. "Depth–Variant Converted–Wave Stacking" 60$^{th}$ Annu Seg Int Mtg (San Francisco, 90.09.23–27) Expanded Tech program Abstr Biogr V 2, PP 1107–1110, 1990 (ISBN 1–56080–013–5; Pap No. SE2 7).

Fertig, J. and M.K. Hentschke. "Data Acquisition and Processing of Converted PS–Waves." 47$^{th}$ Europe Ass Explo Geophys Mtg (Budapest, Hung, Jun. 1985). *Geogphys Prospecting*. vol. 35, No. 2, Feb. 1987, pp. 148–166.

Garotta, R. "Two–Component Acquisition as a Routine Procedure" 54$^{th}$ Annual SEG Int Mtg (Atlanta, 84.12.02–06) Pap; Shear–Wave Exploration (Seg Geophys Dev Ser vol. No. 1) PP 12–136 Society of Exploration Geophysicists, Tulsa, 1986 (ISBN 931830–45–1).

Garotta, R. and P.Y. Granger. "Acquisition and Processing of 3C×3–D Data Using Converted Waves." 58$^{th}$ Annual International SEG Meeting, PP 995–997 Society of Exploration Geophysicists, Anaheim, 1998, Expanded Abstracts with Biographies, 1988 Technical Program vol. 2.

Garotta, R. and P. Marechal. "Shear–Wave Polarization Study Using Converted Waves." 49$^{th}$ Europe Ass Explor Geophys Mtg (Belgrade, Yugo, 87.06.09–12) Tech Program & Pap Abstr, 1987, pp. 8–9.

Harrison, M.P. and R.R. Stewart. "Poststack Migration of P–SV Seismic Data." *Geophysics*. vol. 58, No. 8, Aug. 1993, pp. 1127–1135.

Lawton, D.C. and M.P. Harrison. "A Two–Component Reflection Seismic Survey, Springbank, Alberta." *Canadian Journal of Exploration Geophysics*. vol. 28, No. 1 Jun. 1992, pp. 30–43.

Rommel, B.E. "Dip Move Out Processing (DMO) for Converted Waves in Transversely Isotropic Media." 5$^{th}$ Eage Conf(Amsterdam, Neth, 96.06.03–07). *Extended Abstr*. vol. 1, Poster No. P136, 1996 (ISBN 90–73781–07–8).

Sierra, J., R.J. Michelena and E. Ata. "Effects of Binning Parameters on Lateral and Vertical Resolution of P–S Converted Waves." 4$^{th}$ Brazil Geophys Soc Intl Congr/1st Latin Amer Geophys Union Conf(Rio de Janeiro, Brazil, 95.08.20–24). *Expanded Abstr*. vol. 1, 1995, pp. 382–385.

Taylor, G. G. "The Point of P–S Mode–Converted Reflection: An Exact Determination." *Geophysics*. vol. 54, No. 8, Aug. 1989, pp. 1060–1063.

Tessmer, G., and A. Behle. "Conversion Points and Traveltimes of Converted Waves in Parallel Dipping Layers." *Geophysical Prospecting*. vol. 39, 1991, pp. 387–405.

Thomsen, Leon. "Weak Elastic Anisotropy." *Geophysics*. vol. 51, No. 10, Oct. 1986, pp. 1954–1966.

Thomsen, Leon. "Reflection Seismology Over Azimuthally Anisotropic Media." *Geophysics*. vol. 53, No. 3, Mar. 1988, pp. 304–313.

Tsvankin, Ilya and Leon Thomsen. "Nonhyperbolic Reflection Moveout in Anisotropic Media." *Geophysics*. vol. 59, No. 8, Aug. 1994, pp. 1290–1304.

Yilmaz, Ozdogon. "Seismic Data Processing." Society of Exploration Geophysicists, 1987, pp. 9–89, and 384–427.

Berteussen et al., "Marine Four–Component Acquisition Boosts Role of Shear–Wave Data in Seismic Work," *Oil and Gas Journal*, vol. 95, No. 44, Nov. 3, 1997, pp. 62, 64–67.

Nefedkina et al., "Digital Processing of Transformed Reflected Waves," Soviet Geology and Geophysics, vol. 21, No. 4, 1980, pp. 51–59.

Hron et al., "Synthetic Seismic Sections for Acoustic, Elastic, Anisotropic and Vertically Inhomogeneous Layered Media," *Geophysics*, vol. 51, No. 3, Mar. 1986, pp. 710–735.

Tessmer et al., "Common Reflection Point Data–Stacking Technique for Converted Waves," *Geophysical Prospecting*, vol. 36, No. 7, Oct. 1988, pp. 671–688.

CONVERTED-WAVE PROCESSING IN MANY-LAYERED ANISOTROPIC MEDIA

This application claims the benefit of U.S. Provisional Application No. 60/082,251 filed Apr. 17, 1998, the disclosure of which is incorporated herein by reference.

TECHNICAL FIELD

This invention relates to the general subject of seismic exploration and, in particular, to methods for using converted seismic waves in geophysical exploration.

BACKGROUND OF THE INVENTION

A seismic survey represents an attempt to map the subsurface of the earth by sending sound energy down into the ground and recording the "echoes" that return from the rock layers below. The source of the down-going sound energy might come, for example, from explosions or seismic vibrators on land, or air guns in marine environments. During a seismic survey, the energy source is placed at various locations near the surface of the earth above a geologic structure of interest. Each time the source is activated, it generates a seismic signal that travels downward through the earth, is reflected, and, upon its return, is recorded at a great many locations on the surface. Multiple explosion/recording combinations are then combined to create a nearly continuous profile of the subsurface that can extend for many miles. In a two-dimensional (2D) seismic survey, the recording locations are generally laid out along a single line, whereas in a three dimensional (3D) survey the recording locations are distributed across the surface in a grid pattern. In simplest terms, a 2D seismic line can be thought of as giving a cross sectional picture (vertical slice) of the earth layers as they exist directly beneath the recording locations. A 3D survey produces a data "cube" or volume that is, at least conceptually, a 3D picture of the subsurface that lies beneath the survey area. In reality, though, both 2D and 3D surveys interrogate some volume of earth lying beneath the area covered by the survey.

A seismic survey is composed of a very large number of individual seismic recordings or traces. In a typical 2D survey, there will usually be several tens of thousands of traces, whereas in a 3D survey the number of individual traces may run into the multiple millions of traces. Chapter 1, pages 9–89, of *Seismic Data Processing* by Ozdogan Yilmaz, Society of Exploration Geophysicists, 1987, contains general information relating to conventional 2D processing and that disclosure is incorporated herein by reference. General background information pertaining 3D data acquisition and processing may be found in Chapter 6, pages 384–427, of Yilmaz, the disclosure of which is also incorporated herein by reference.

A modern seismic trace is a digital recording (analog recordings were used in the past) of the acoustic energy reflecting back from inhomogeneities or discontinuities in the subsurface, a partial reflection occurring each time there is a change in the elastic properties of the subsurface materials. The digital samples are usually acquired at 0.002 second (2 millisecond or "ms") intervals, although 4 millisecond and 1 millisecond sampling intervals are also common. Each discrete sample in a digital seismic trace is associated with a travel time, and in the case of reflected energy, a two-way travel time from the surface to the reflector and back to the surface again. Further, the surface location of the shot-receiver combination that gave rise to each seismic trace is carefully tracked during acquisition and is often made a part of the trace itself, where it can be accessed as needed during subsequent processing steps. One important use for this information arises when an explorationist correlates the seismic reflections with specific surface and subsurface locations, i.e. when he or she posts and/or contours seismic data values—and attributes extracted therefrom—on a map (i.e., "mapping").

The data in a 3D survey are amenable to viewing in a number of different ways. First, horizontal "constant time slices" may be extracted from a stacked or unstacked seismic volume by collecting all of the digital samples that occur at the same travel time. This operation results in a 2D horizontal plane of seismic data. By animating a series of these 2D planes, it is possible for the interpreter to pan through the volume, giving the impression that successive layers are being stripped away so that the information that lies underneath may be observed. Similarly, a vertical plane of seismic data may be taken at an arbitrary azimuth through the volume by collecting and displaying the seismic traces that lie along a particular line. This operation, in effect, extracts an individual 2D seismic line from within the 3D data volume.

Seismic data that have been properly acquired and processed can provide a wealth of information to the explorationist, one of the individuals within an oil company whose job it is to locate potential drilling sites. For example, a seismic profile gives the explorationist a broad view of the subsurface structure of the rock layers and often reveals important features associated with the entrapment and storage of hydrocarbons and other subsurface resources, including features such as faults, folds, anticlines, unconformities, and sub-surface salt domes and reefs, among many others. During the computer processing of seismic data, estimates of subsurface rock velocities are routinely generated and near surface inhomogeneities are detected and displayed. In some cases, seismic data can be used to directly estimate rock porosity, water saturation, and hydrocarbon content. Less obviously, seismic waveform attributes such as phase, peak amplitude, peak-to-trough ratio, and a host of others, can often be empirically correlated with known hydrocarbon occurrences and that correlation applied to seismic data collected over new exploration targets.

Speaking in broad generalities, seismic energy propagates through the earth in one of two forms: compressional or "P" waves and shear or "S" waves, either of which might be generated by a wide variety of seismic sources. "Converted waves" are those waves that travel first as one type of wave and then the other, the conversion between wave-types happening at any seismic discontinuity. If the conversion happens once only, from an incident P-wave to a reflected S-wave, this mode will be called a C-wave. In anisotropic media, each such conversion will reflect both fast and slow shear waves, which modes may be termed fast and slow C-modes, respectively. Flat-lying polar anisotropic ("VTI") layers give rise to only one C-mode reflection (polarized in-line).

This conversion between P and S waves is predicted theoretically and has also been observed in practice. Although any seismic experiment generates generous amounts of such converted waves, ordinary techniques of seismic signal reception and processing are designed to suppress these waves in favor of pure-mode (e.g., P-wave) arrivals.

Nonetheless, there are many exploration and exploitation settings wherein one would wish to maximize—rather than to suppress—converted-wave arrivals, e.g., where the target cannot be readily imaged by P-waves. This might happen, for example, where the elastic contrasts of the subsurface rock layers yield only weak P-reflections; where salt bodies occur above the target; or, where subsurface "gas clouds" or gas "plumes" obscure the target, as might occur in connection with a hydrocarbon reservoir, above which the overburden contains a small concentration of gas. In this later situation, the gas may severely delay and attenuate conventional P-waves traveling through the overburden, so that the underlying reservoir will be poorly imaged on a "P" section. However, a gas-filled rock unit does not unduly slow or attenuate shear waves, so one might hope to be able to obtain better images of such reservoirs using conventional pure-mode S-wave techniques. Of course, if the seismic target lies offshore, a complication arises because shear waves do not travel through liquids, a fact which makes their generation and recording problematic. In that case, however, converted waves in combination with ocean bottom multicomponent receivers can make practical the recording of shear energy reflecting from water covered exploration targets.

Conventional seismic processing relies heavily on a stack (or average) of seismic traces from a common midpoint ("CMP", hereinafter) gather to reduce coherent and incoherent noise in the seismic section, and as a tool for estimating subsurface velocities (e.g., via constant velocity stacks). The stacking approach is generally satisfactory for single mode seismic data, but often fails when applied to converted mode data. One reason for this is that the travel paths of the converted mode waves are asymmetrical, even for simple horizontally layered media. Multiple coverage of the same subsurface point cannot be achieved for C-mode (i.e., converted mode) data by stacking a CMP gather, but instead requires true common reflection point ("CRP", hereinafter) sorting which, for C-mode reflections, is actually a common conversion point gather (a "CCP" gather, hereinafter). In brief, the standard methods used to form converted mode CCP gathers in the past have been generally unsatisfactory.

The standard method for processing C-mode data into interpretable seismic sections and volumes is founded on the assumption that the subsurface is a homogeneous isotropic medium (cf., Tessmer and Behle, 1988, "Common Reflection Point Data-Stacking Technique for Converted Waves", *Geophysical Prospecting*, 36, 671–688, the disclosure of which is incorporated herein by reference). To the extent that this assumption is incorrect, conventionally processed seismic data will yield a less than accurate representation of that subsurface. As might be expected, interpretations that are based on inaccurate images will also be suspect and could ultimately contribute to the drilling of a dry hole. Of course, the homogeneity assumption is not realistic in many exploration areas and, in fact, the subsurface rock units have often proven to be both inhomogeneous and anisotropic.

Thus, there is a real need for a method of processing converted mode seismic data that can accommodate inhomogeneous, anisotropic layered media. Additionally, the method should provide simple closed-form expressions that make possible hyperbolic and post-hyperbolic moveout removal, and computation of the conversion-point offset for the same sort of media. Accordingly, it should now be recognized, as was recognized by the present inventor, that there exists, and has existed for some time, a very real need for a method of seismic data processing that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

In accordance with the present invention, a method is disclosed herein for the processing of converted-wave seismic data into interpretable images. In more particular, this instant technique extends conventional C-mode seismic data processing to the minimally reasonable case of layered, anisotropic media and makes converted-wave processing practicable in realistic situations. This technique utilizes a compact two-parameter representation that describes the subsurface location of conversion points for converted wave data within layered anisotropic media.

According to one aspect of the instant invention, a method of C-mode seismic data processing is provided which is based on simple, data-driven formulae that are appropriate for use with geologic models that may exhibit vertical inhomogeneity (layering) and/or polar anisotropy. The instant method provides for the computation of time-domain CCP "stacks" using the true, time-dependent conversion point. The computation is preferably done in "time," rather than "depth," since estimated depths are potentially imprecise in the presence of anisotropy. Additionally, time-domain computations are somewhat simpler than their depth-domain counterparts. However, although the language hereinafter will generally be couched largely in terms of "time" computations, those of ordinary skill in the art will recognize that the methods suggested hereinafter can easily be adapted to work in either the time or depth domain.

In practice, C-mode seismic data processed using conventional processing techniques (i.e., assuming isotropic homogeneity and, hence, a single velocity ratio $V_p/V_s$) can be significantly inferior to data that have been processed using the instant methods. Where detailed and accurate knowledge of the subsurface is particularly needed (e.g., in reservoir exploitation projects), the instant methods are particularly useful. Further, use of the instant methods is important during the acquisition planning stage, where their use on synthetic seismic data can help insure that the area that is to be imaged will be properly illuminated.

According to another aspect of the instant invention, there is provided a method of selecting "unconventional" parameter values for use with conventional processing software so as to best utilize that software when processing converted mode data. Seismic processing software that relies upon an assumption of isotropy can yield acceptable results, provided that the software is given these unconventional—rather than the natural or conventional—parameter values. A method for selecting such parameters is described hereinafter. The residual errors arising from the use of these unconventional parameter values with conventional software may be estimated by evaluating the anisotropic correction factors given hereinafter. The anisotropic correction factors may be estimated from the data itself.

According to still another aspect of the instant invention, there is provided a method of seismic data processing substantially as desribed above, but that contains the further steps of using the C-mode processed data to uncover seismic attributes that can be correlated with subsurface structural and stratigraphic features of interest, thereby providing quantitative values that can be mapped by the explorationist and used to predict conditions favorable for subsurface hydrocarbon generation, migration, or accumulation. It is well known in the seismic interpretation arts that spatial variations in a seismic reflector's character may often be empirically correlated with changes in reservoir lithology or fluid content. Since the precise physical mechanism which gives rise to this variation in reflection character may not be well understood, it is common practice for interpreters to calculate a variety of seismic attributes and then plot or map them, looking for an attribute that has some predictive value. Attributes calculated from C-mode seismic data that have been correctly processed by the instant methods are potentially more representative of the subsurface than those obtained from conventionally processed seismic data.

Finally, the instant inventor has discovered that C-mode seismic data processed by these same techniques may be formed into unstacked gathers (either 2D or 3D) for use in conventional amplitude variations with offset studies (AVO, hereinafter, also sometimes referred to as amplitude variation with angle-of-incidence or "AVA"). Since the instant methods produce an improved unstacked C-mode gather, it is natural to apply conventional AVO techniques to the analysis thereof. For a discussion of some conventional AVO methods, see, for example, "Avo Analysis: Tutorial & Review", by J. Castagna, appearing in *Offset-Dependent Reflectivity—Theory and Practice of AVO Analysis*, John Castagna and Milo Backus (editors), SEG Press, 1993.

The foregoing has outlined in broad terms the more important features of the invention disclosed herein so that the detailed description that follows may be more clearly understood, and so that the contribution of the instant inventor to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

DETAILED DESCRIPTION

Figure 1A:
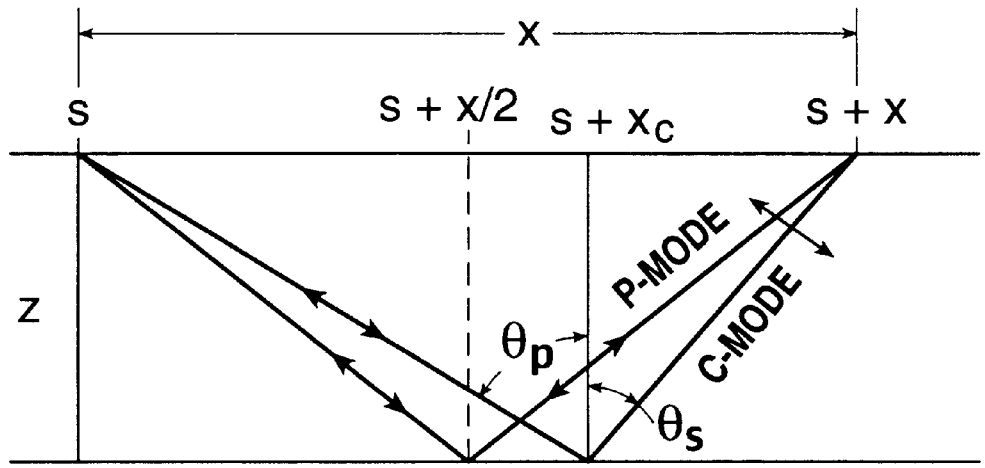
FIG. 1A contains a representation of converted wave geometry for a single thick, homogeneous, isotropic layer, and FIG. 1B contains a similar illustration for a multi layered medium.

While this invention is susceptible of embodiment in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments or algorithms so described.

ENVIRONMENT OF THE INVENTION

Figure 7:
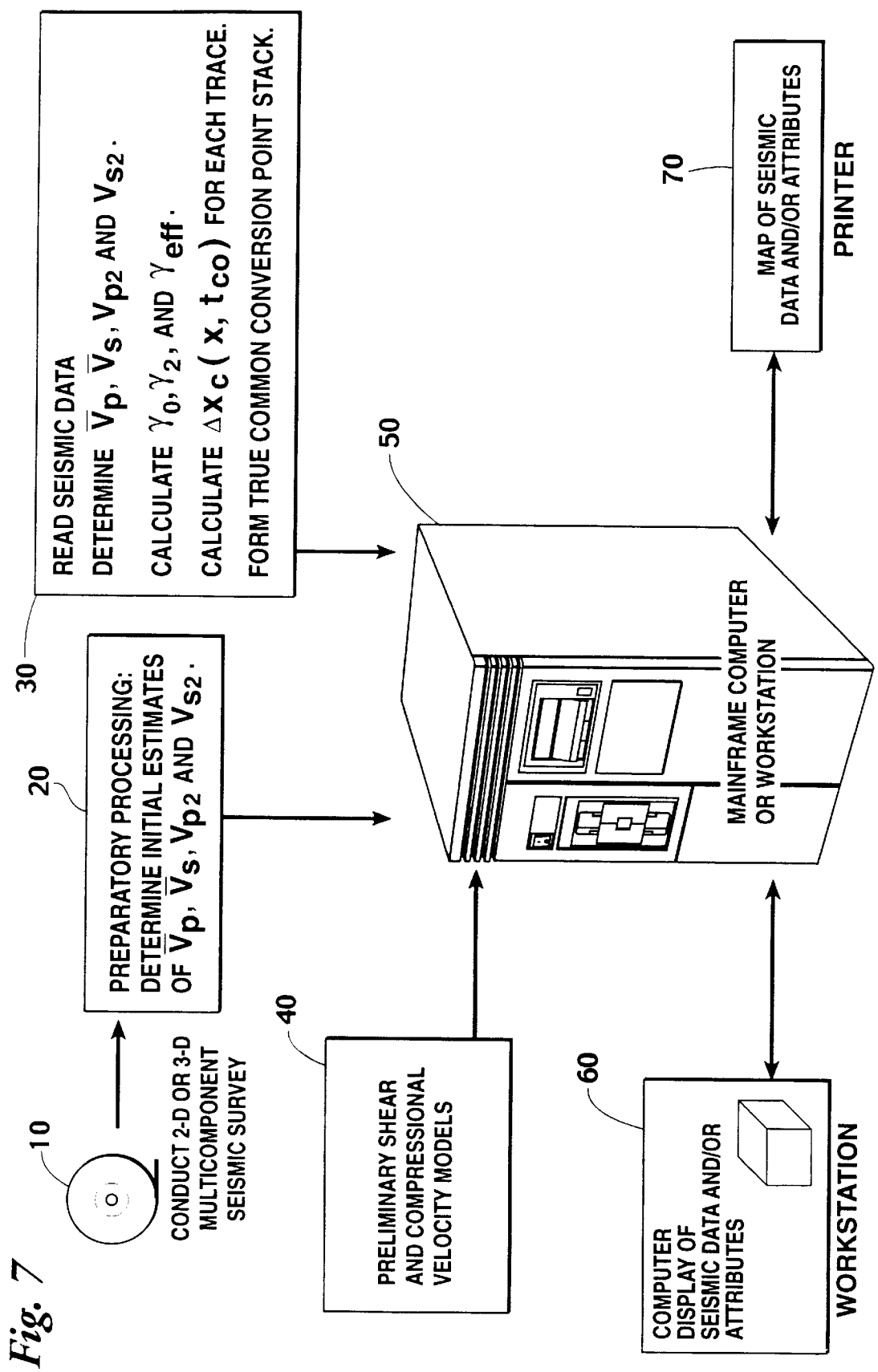
FIG. 7 illustrates generally the environment in which the invention disclosed herein would typically be used.

FIG. 7 illustrates the general environment in which the instant invention would typically be used. Seismic data 10 are collected in the field over a subsurface target of potential economic importance and are then sent to a processing center. There a variety of conventional preparatory processes 20 are applied to the seismic traces to make them ready for use by the methods disclosed hereinafter. The processed traces would then be made available for use by the instant invention and might be stored, by way of example only, on hard disk, magnetic tape, magneto-optical disk, DVD disk, or other mass storage means.

The methods disclosed herein would best be implemented in the form of a computer program 30 that has been loaded onto a general purpose programmable computer 50 where it is accessible by a seismic interpreter or processor. A general purpose computer 50 includes, in addition to mainframes and workstations, computers that provide for parallel and massively parallel computations, wherein the computational load is distributed between two or more processors. As is also illustrated in FIG. 7, some sort of initial compressional and shear velocity models 40 must be specified and provided as input to the processing computer program. The exact means by which such models are created, digitized, stored, and later read during program execution is unimportant to the instant invention and those skilled in the art will recognize that this might be done any number of ways.

A program 30 embodying the instant invention might be conveyed into the computer that is to execute it by means of, for example, a floppy disk, a magnetic disk, a magnetic tape, a magneto-optical disk, an optical disk, a CD-ROM, a DVD disk, or loaded over a network. In a typical seismic processing environment, the methods of the instant invention would be made part of a larger package of software modules that is designed to perform many of the processing steps listed in FIG. 8. After processing by the instant methods, the resulting traces would then typically be sorted into CRP gathers, stacked, and displayed either at a high resolution color computer monitor 60 or in hard-copy form as a printed seismic section or a map 70. The seismic interpreter would then use the displayed images to assist him or her in identifying subsurface features conducive to the generation, migration, or accumulation of hydrocarbons.

Preparatory Processing

Figure 8:
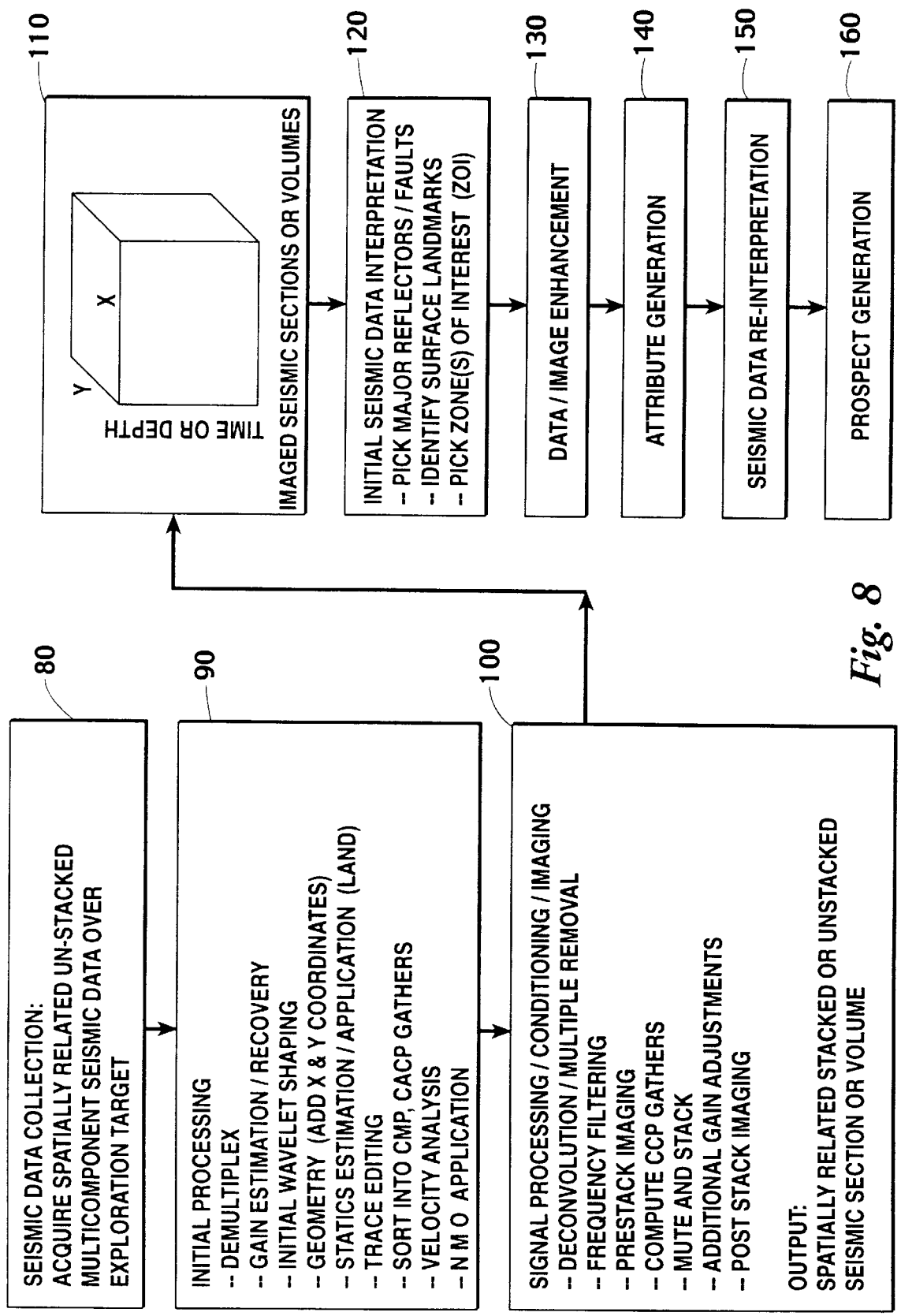
FIG. 8 is a schematic diagram that illustrates how the instant invention might be utilized within a conventional exploration seismic processing stream.

As a first step, and as is generally illustrated in FIG. 8, a 2D or 3D multicomponent seismic survey is conducted over a particular volume of the earth's subsurface (step 80). The data that are collected in the field consist of unstacked (i.e., unsummed) multicomponent seismic traces which contain digital information representative of the volume of the earth lying beneath the survey. Methods by which such data are obtained and processed into a form suitable for use by seismic processors and interpreters are well known to those skilled in the art. Additionally, those skilled in the art will recognize that the processing steps illustrated in FIG. 8 are only broadly representative of the sorts of steps that seismic data would normally go through before it is interpreted: the choice and order of the processing steps, and the particular algorithms involved, may vary markedly depending on the particular seismic processor, the signal source (dynamite, vibrator, etc.), the survey location (land, sea, etc.) of the data, and the company that processes the data.

The goal of a seismic survey is to acquire a collection of spatially related seismic traces over a subsurface target of some potential economic importance. The instant invention is designed to operate with multicomponent seismic data which might originate, by way of example, from a 2D or 3D multicomponent land, or ocean bottom seismic survey, from a multicomponent VSP (i.e., vertical seismic profile), or a multicomponent vertical cable recording. However, the invention disclosed herein is most effective when applied to a group of seismic traces that have an underlying spatial relationship with respect to some subsurface geological feature. For purposes of specificity only, the discussion that follows will be couched in terms of traces collected during a conventional multicomponent 2D or 3D seismic survey.

Multi component data consists of data recorded from several different sensors at each location, each of which is sensitive to a different vector component of ground motion. In the typical case, there are three orthogonal sensors at each location; in the ideal case each responds only to vector ground motion parallel to the polarization axis of that sensor. One sensor is usually oriented so that its axis of polarization is vertical; the other two are then placed horizontally with (or without) a known azimuthal orientation. Because seismic energy usually arrives at surface receivers along near-vertical ray paths, reflected P-waves (being longitudinally polarized) will tend to register mainly on the vertical receiver component. Likewise, converted S-waves—which also reach the surface along nearly vertical ray paths, but which are transversely polarized—register mainly on the horizontal receivers. Through methods well known to those skilled in the art, raw seismic data recorded from three sensors which have been configured in any (non-degenerate) arbitrary orientation can be processed so that the resulting traces may be regarded as 3-component vector data, wherein each trace separately records motion that occurs along a different axis of the same uniform coordinate system (e.g., (X, Y, Z)=(East, South, Down)).

By convention, horizontal sensors that are aligned (or realigned to lie) along the line connecting the receiver to a source are "radially" aligned and will be designated, as $S_R$ receivers. Sensors that are aligned/realigned to be perpendicular to radial sensors (i.e., oriented perpendicularly to a line connecting source and receiver) are said to be "transversely" aligned, or $S_T$ receivers hereinafter. By convention, the transverse sensors are usually oriented 90 degrees clockwise (viewed from above) from the radial sensors. The C-wave analysis of the instant invention will typically be performed on the radial component, with a polarity adjustment being applied in the case of split-spread gathers, the nature of this adjustment being well-known to those skilled in the art.

After the seismic data are acquired, they are typically taken to a processing center where some initial or preparatory processing steps are applied to them. As is illustrated in FIG. 8, a common early step is the specification of the geometry of the survey (step 90). As part of this step, each seismic trace is associated with both the physical receiver (or array) on the surface of the earth that recorded that particular trace and the "shot" (or generated seismic signal) that was recorded. The positional information pertaining to both the shot surface position and receiver surface position remain associated with each seismic trace during its processing. This information might be used at a number of different points in the processing sequence including, for example, during the determination of stacking velocities, as part of the NMO (i.e., "normal move-out") correction step, and in determining the position of the resulting "stacked" seismic traces. It would typically be during—or in conjunction with—the velocity analysis/NMO processing steps that one aspect of the instant invention might first be applied.

After the initial pre-stack processing is completed, it is customary to condition the seismic signal on the unstacked seismic traces before creating stacked (or summed) data volumes (step 100)—one for each sensor component. In FIG. 8, the "Signal Processing/Conditioning/Imaging" step suggests a typical processing sequence, although those skilled in the art will recognize that many alternative processes could be used in place of the ones listed in the figure. In any case, the ultimate goal is the production of a stacked P or C seismic volume or, in the case of 2D data, a stacked P or C seismic line.

As is suggested in FIG. 8, any digital sample within a stacked seismic volume is uniquely identified by an (X, Y, TIME) triplet: the X and Y coordinates representing the positions on the surface of the earth of the associated source and receiver, and the time coordinate measuring a recorded arrival time within the seismic trace (step 110). For purposes of specificity, it will be assumed that the +X direction corresponds to the "in-line" direction, and the +Y direction corresponds to the "cross-line" direction, as the terms "in-line" and "cross-line" are generally understood to mean in the art. Although time is the preferred and most common vertical axis unit, those skilled in the art understand that other units are certainly possible might include, for example, depth. That being said, the discussion that follows will be framed largely in terms of "time" as a vertical axis measure, but that choice was made for purposes of specificity, rather than out of any intention to so limit the methods disclosed herein.

Another important use for seismic data is as a source for seismic attributes (step 140). As is well known to those skilled in the art, seismic attributes are values that are calculated from seismic data and that serve to highlight some specific property or feature of the data that might not otherwise be apparent. Although FIG. 8 seems to indicate that seismic attribute generation 140 takes place relatively late in the processing sequence, that is not always the case and attributes might potentially be calculated at almost any point in the sequence.

TECHNICAL BACKGROUND

Single Layer Analysis

It should be noted at the outset that, although the discussion that follows is primarily couched in terms of VTI layers and their effect on C-mode seismic data propagation, the results presented hereinafter will also be generally applicable to data containing reflections from azimuthaly anisotropic media. However, the instant methods are preferably applied—and yield the best results—in anisotropic settings where the difference between fast and slow shear velocities is smaller than the S/P-wave velocity differences. This condition is commonly satisfied in practice. That being said, the discussion that follows begins by making the prior state-of-the-art assumption, i.e., that the medium is homogeneous and isotropic.

Some of the principal difficulties inherent in the practice of C-wave exploration and processing may be understood by reference to FIG. 1A. This figure contains a representation of a thick uniform isotropic layer of thickness "z", and an up-going C-mode reflection from the bottom of that layer, which is sourced from a down-going P-wave. The P-wave originates at surface location "s" and travels into the subsurface at velocity $V_p$ until it encounters the bottom of the layer, which it strikes at angle $\theta_P$ with respect to the vertical. This P-wave is reflected from the bottom of the layer as an S-wave at angle $\theta_S$ traveling at velocity Vs and is received back at the surface at horizontal offset "x" from the shot. The two angles (incidence and reflection) are related by Snell's law:

$$\sin\theta_p / V_p = \sin\theta_s / V_s = p = \frac{dt_c}{dx}, \quad (1)$$

where p is the "ray parameter," as that term is known to those skilled in the art (and which is a constant value along the ray), and $t_c$ is the arrival time of the C-wave at offset x. Note that the offset to the image point at depth in the subsurface, $x_c$ (i.e., the point that is illuminated by this ray) differs from the shot-receiver midpoint by a distance which depends upon the physical parameters of the earth model. In more particular, this difference depends on the ratio of the P and S velocities, $V_p$ and $V_s$ respectively, in the overburden: $\gamma = V_p/V_s$, hereinafter. By contrast, in pure-mode wave propagation through this same flat-layer model, the offset to the illuminated point (i.e., the midpoint x/2) can be determined geometrically, and no rock parameters need be specified.

The parameter $\gamma$ is a well known physical/rock parameter and specification of its correct value is necessary to the proper processing of C-mode data. Hence, rock properties play a larger role in the processing and analysis of C-waves than in P-waves and knowledge of the underlying inhomogeneity and anisotropy of the medium is much more crucial for C-waves. In short, a proper image of the subsurface cannot even be formed without careful consideration and utilization of this physical parameter, whereas in pure mode propagation, physical characterization of the subsurface rock parameters may follow imaging.

Turning again to FIG. 1A, those skilled in the art will recognize that the moveout of the C-wave is not hyperbolic. In this simple case, the exact travel time from the source to the receiver at offset "x" may be determined via elementary trigonometry (cf., Tessmer and Behle, cited previously) to be:

$$t_c = t_p(x) + t_s(x) = \frac{z}{V_p \cos\theta_p(x)} + \frac{z}{V_s \cos\theta_s(x)} \quad (2)$$

where $t_p$ is the (one-way) oblique travel time through the layer for the P-wave, and $t_s$ is the corresponding one-way shear time. Similarly, the exact emergence offset x for this simple model is given by $$x = V_p t_p \sin\theta_p + V_s t_s \sin\theta_s = pV_p^2 t_p + pV_s^2 t_s. \quad (3)$$

However, for more complicated cases, approximations to the previous expression will be needed. Using a conventional expansion of the expression for $t_c$ as a Taylor series in $t^2$ vs. $x^2$ yields:

$$t_c^2(x) = t_{c0}^2 + x^2/V_{c2}^2 + A_4 x^4 + \quad (4)$$

The two-way C-wave zero-offset time $t_{c0}$, which corresponds to vertical travel in this context, may be written in terms of the one-way pure-mode times as:

$$t_{c0} = t_{p0} + t_{s0} = t_{p0}(1 + t_{s0}/t_{p0}) = t_{p0}(1+\gamma) \quad (5)$$

In the present context, the amplitude of the energy arriving at vertical incidence is zero, but the time $t_{c0}$ may still be found by extrapolating times from obliquely incident arrivals to zero offset, or by examining C-wave "stacks". Of course, the determination of $t_{p0}$ requires separate P-wave data, and an interpreted correspondence between P-wave and C-wave arrivals. It will be assumed in the text that follows that this information is available.

The C-wave short-spread moveout velocity $V_{c2}$ in equation (4) is given by:

$$V_{c2}^2 = \frac{V_p^2 t_{p0} + V_s^2 t_{s0}}{t_{p0} + t_{s0}} = \frac{V_p^2}{1+\gamma} + \frac{V_s^2}{1+1/\gamma}, \quad (6)$$

where a spread is usually considered to be "short" if the far trace offset does not exceed the depth to the target reflector.

For the single homogeneous isotropic layer of FIG. 1A, the quartic moveout parameter $A_4$ is given by $$A_4 = \frac{-(\gamma - 1)^2}{4(\gamma + 1)t_{c0}^2 V_{c2}^4} \quad (7)$$

(cf., Tsvankin and Thomsen, "Nonhyperbolic Reflection Moveout in Anisotropic Media," 1994, *Geophysics*, v. 59, n. 8, 1290–1304, the disclosure of which is incorporated by reference). This means that, at x/z=1, the quartic term is −25% of the hyperbolic term if $\gamma$=3, or −8% if $\gamma$=2. It also means that $A_4$ is not independent of the parameters $\gamma$ and $V_{c2}$ introduced previously, and, thus, is not generally available for fitting, e.g., to flatten the gathers.

It should be noted that the Taylor series expansion is not a very good approximation. In the limit of large x, it implies that $t_c^2$ should be increasing as $x^4$, which is obviously not reasonable; instead it should be increasing as $x^2$, but with the correct velocity coefficient. However, by modifying the quartic term in the previous expression, the appropriate behavior may be obtained:

$$t_c^2(x) = t_{c0}^2 + x^2/V_{c2}^2 + \frac{A_4 x^4}{1 + A_5 x^2} \quad (8)$$

At small-to-moderate offsets x, this expression approximates equation (4), whereas at large offsets, the "1" in the denominator of the final term is negligible, so that the $x^4$ dependence effectively becomes an $x^2$ dependence, with a coefficient such that the last two terms above yield the correct limiting velocity. The parameter $A_5$ may be shown to be $$A_5 = -A_4 V_{c2}^2 \bigg/ \left(1 - \frac{V_{c2}^2}{V_{p2}^2}\right) \tag{9}$$

(cf., Thomsen, "Converted-Wave Seismology over Anisotropic Inhomogeneous Media," Extended Abstracts, Soc. Expl. Geophysics. Convention, pp. 2048–2051, 1998). Hence, the parameter $A_5$ is not a new "free" variable, but is fully determined by the other variables introduced previously. So, at no extra cost, equation (8) has the correct limiting behavior at both short and long offsets, and varies smoothly in between. This result is generalized below to apply to layered anisotropic media.

Conversion Point Offset for a Homogeneous Isotropic Layer

Using elementary trigonometry in the simple case of FIG. 1A, it is easy to see that the offset $x_c$ of the C-wave conversion point is given by:

$$x_c = V_p t_p \sin \theta_p = p V_p^2 t_p \tag{10}$$

(See, for example, Tessmer and Behle, cited previously). Hence, as a fraction of the total offset, the conversion point is (exactly):

$$\frac{x_c}{x} = \frac{1}{1 + V_s^2 t_s / (V_p^2 t_p)} = \frac{1}{1 + \frac{t_s(x)}{\gamma^2 t_p(x)}} \tag{11}$$

Since both of the oblique one-way times $t_p$ and $t_s$ are functions of x, this relation is much more complicated than it looks. However, in the limit of vertical travel (i.e., of small values of x/z, offset divided by thickness), the ratio of travel times becomes $$t_s(x)/t_p(x) \to t_{s0}/t_{p0} = V_p/V_s = \gamma$$

so that, in this "asymptotic limit", the conversion point is:

$$x_{c0} = \frac{x}{1 + 1/\gamma} \tag{12}$$

Figure 2:
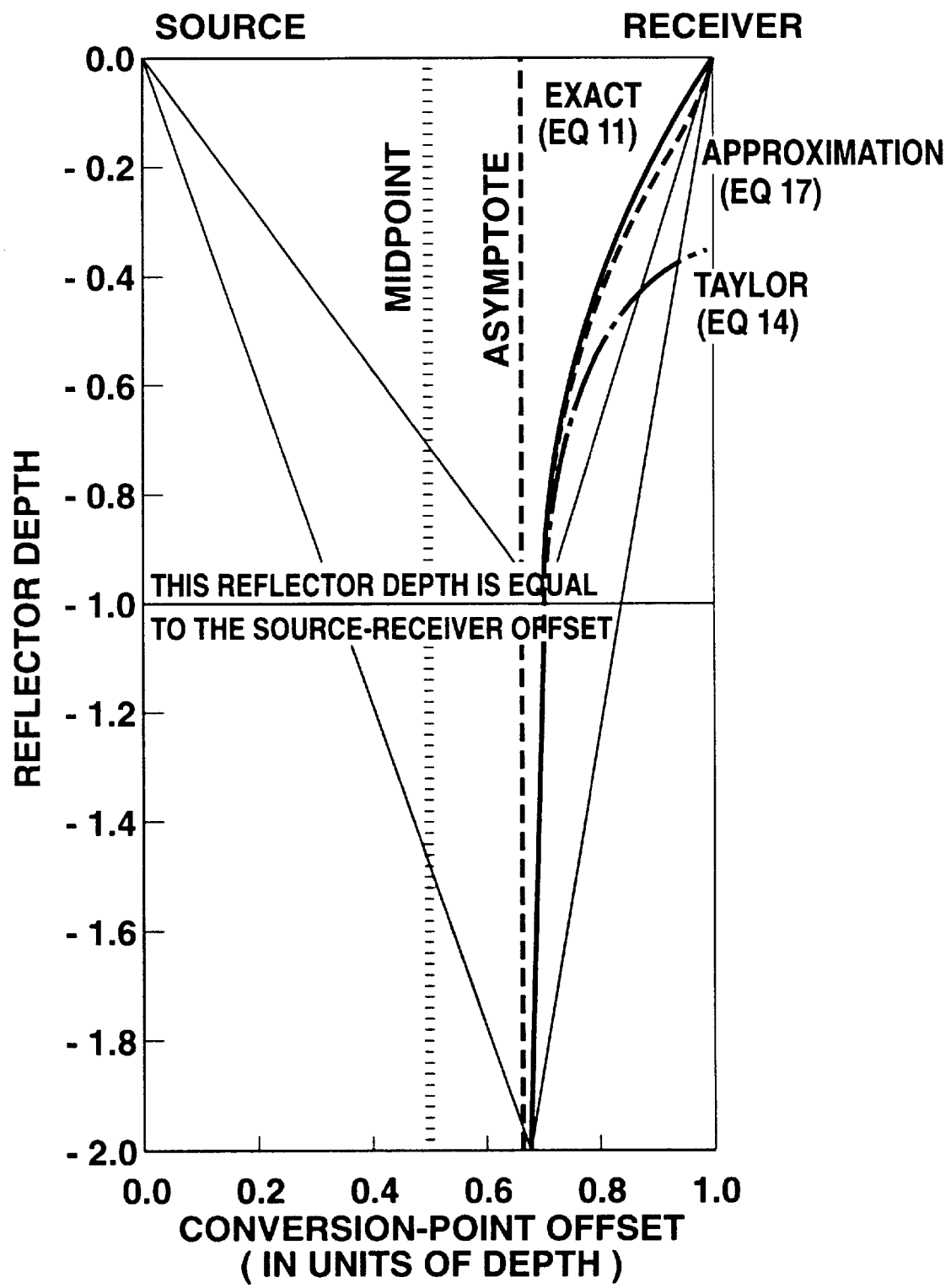
FIG. 2 is a plot of the predicted conversion point as a function of z/x (depth to the reflector/offset) for a fixed offset and a single thick homogeneous, isotropic layer.

For larger offsets (or shallower depths), the previous equation may be expressed in terms of the offset $D = x_c - x/2$ of the reflection point from the midpoint:

$$\frac{1}{z^2}\left(D^2 - \frac{x^2}{4}\right)^2 + (D^2 - kxD + x^2/4) = 0 \tag{13}$$

where the parameter k is given by $k \equiv (\gamma^2+1)/(\gamma^2-1)$. In this arrangement, the behavior of the curve at both limits (i.e., as x/z goes to infinity and zero) is apparent from the separate solutions which follow directly from the neglect of one term or the other, above. FIG. 2 shows how the conversion point $x_c$ varies with reflector depth z for fixed offset.

Figure 3:
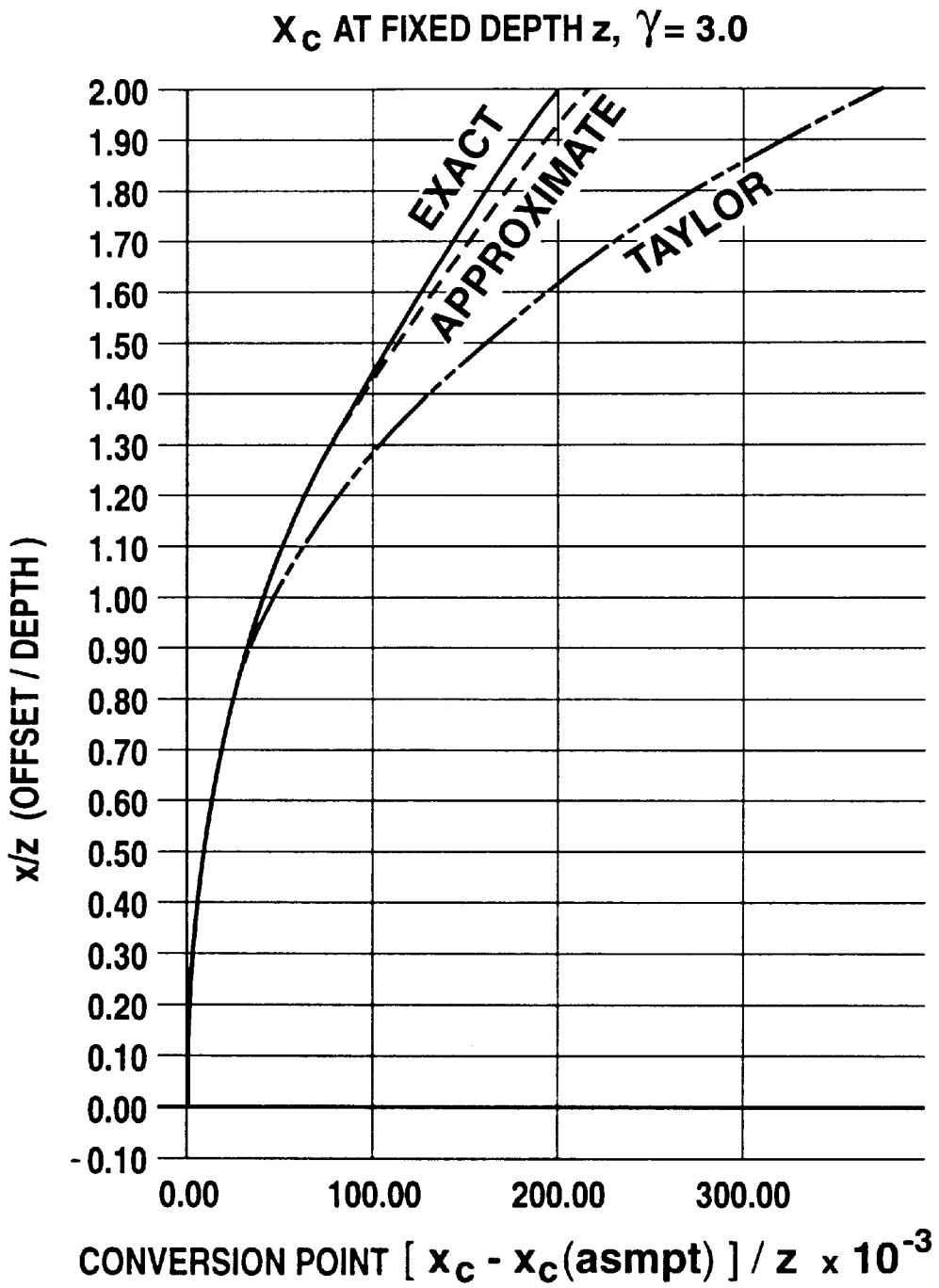
FIG. 3 is a plot of the displacement of the actual conversion point from the asymptotic conversion point as a function of changing offset (x/z, z fixed).
Figure 4:
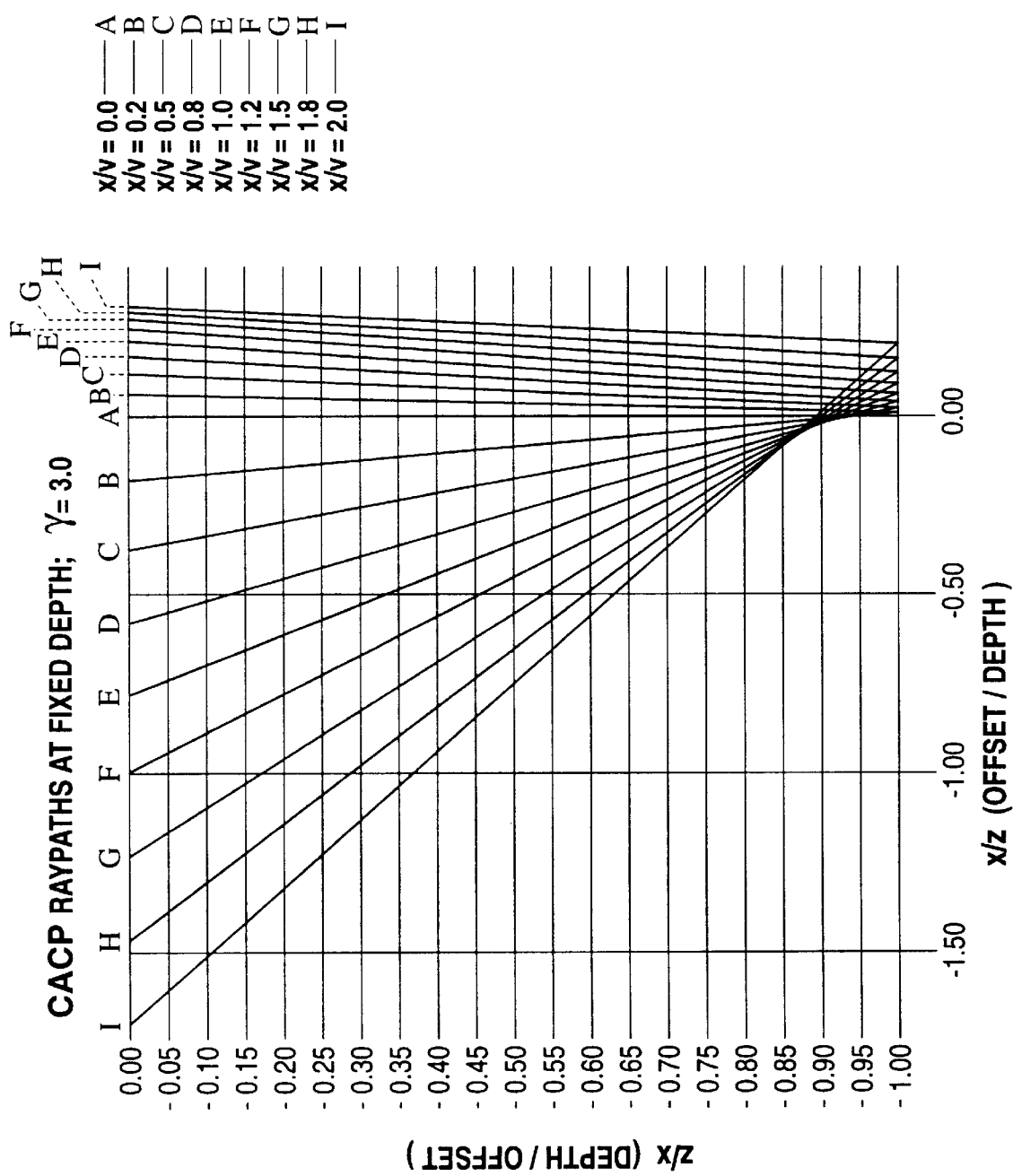
FIG. 4 contains a plot of some of the ray paths that were used to produce the result in FIG. 3.

Looking at the same calculation from a different point of view, the solution of the previous equation can be regarded as a function of x/z, this time with z fixed (i.e., concentrating on a single event), and x varying from zero to some maximum value. In fact, it is common, for velocity determination purposes, to bin together traces with this range of offsets, all with a common value of the asymptotic conversion point, $x_{c0}$. In such a Common Asymptotic Conversion Point (CACP) gather, the actual reflection points are smeared between this point $x_{c0}$, and the actual values for $x_c(x)$. FIG. 3 shows the resulting displacement of the actual conversion points from the asymptotic point, $x_c - x_{c0}$, and FIG. 4 shows the corresponding ray paths.

In practice, the offset from the asymptotic conversion point $x_{c0}$ may be substantial. For example, in a modern marine survey, the maximum offset x may be of order 4 km, with the target at a similar depth (x/z=1). In recent clastic sediments, γ may be close to 3. Using these numbers in equation (14), the smear, $x_c - x_{c0}$ reaches 187 m for the receivers at the end of the spread. This means that if an arrival were to be regarded as imaging the conversion point at $x_{c0}$, instead of at $x_c$, that energy would be misplaced by many bins. This is not a negligible smear, in most cases.

If the acquisition is split-spread (as is easy to achieve on land, or at sea with an Ocean Bottom Survey), with the same maximum offset in each direction, the smear is just twice that calculated above, distributed symmetrically about the CACP. Further, since in this context the normal incidence reflectivity is zero, the traces at the distal ends of this smeared region have the greatest amplitudes. Hence, an acceptable procedure for the computation of stacked traces must honor the depth dependent conversion-point $x_c(x/z)$.

A Taylor expansion of the solution to equation (13) may be developed which is valid for small but finite values of x/z:

$$x_c(x,z) \approx x[C_0 + C_2(x/z)^2] \tag{14}$$

where the coefficients are given in the homogeneous isotropic case by:

$$C_0 = \frac{1}{1 + 1/\gamma} \tag{15}$$

and $$C_2(\gamma) = \frac{\gamma}{2} \frac{(\gamma - 1)}{(\gamma + 1)^3}. \tag{16}$$

A plot that graphically compares the previous solutions may be found in FIG. 2. Note that equation (14) appears to be accurate for values of x/z as large as 1/0.8, but deviates strongly at larger offsets or shallower depths.

A better approximate solution can be derived as follows:

$$x_c(x, z) \approx \left[C_0 + \frac{C_2(x/z)^2}{(1 + C_3(x/z)^2)}\right] \tag{17}$$

with $$C_3 = C_2/(1 - C_0) \tag{18}$$

which has the same properties as equation (8): it is asymptotically correct at both limits (i.e., as x/z approaches zero and as x/z approaches infinity), and varies smoothly in between. In FIG. 2, this approximation is seen to be numerically accurate to values of x/z as large as about 1/0.3. Rays reflecting from deep targets of exploration interest with these wide angles will not appear in most data sets, so these are acceptable errors. There is no strong advantage to using this approximation (aside from the intuitive insight which it offers) in the simple case of FIG. 1A for which the exact solution of Tessmer and Behle (cited previously) is available. However, this approximation will be quite useful in more realistic cases to be discussed hereinafter (e.g., in a FIG. 1B-type multi-layer cases).

Multiple Layer Converted Mode Analysis

According to a first aspect of the instant invention, there is provided a method for correctly processing C mode seismic data, wherein the recorded reflections potentially arise from multiple subsurface layers. Further, this method relies on simple, data-driven approximate formulae that are appropriate for use with geologic models that exhibit vertical inhomogeneity (layering) and polar anisotropy. The instant method additionally provides for the computation of time-domain common conversion point (i.e., "CCP") "stacks" using the true, time-dependent conversion point as determined by the methods discussed hereinafter, and for the computation of unstacked CCP gathers.

Figure 1B:
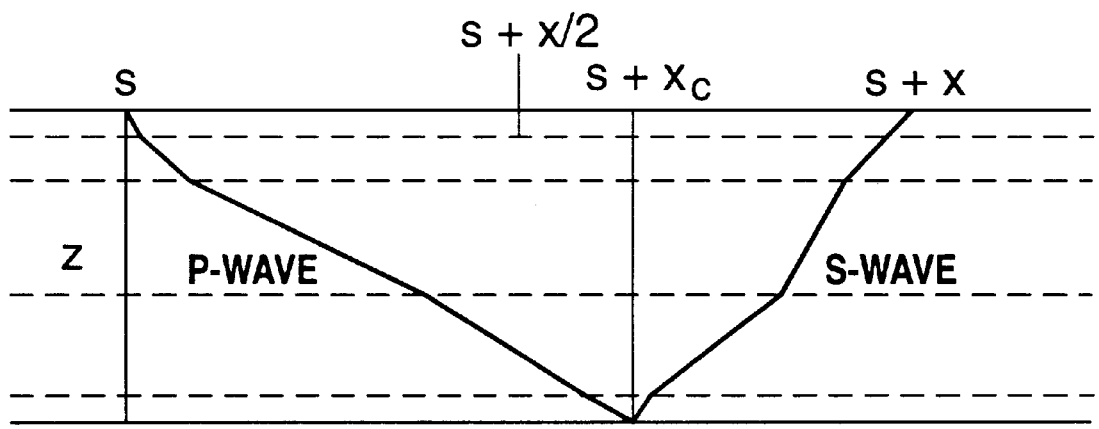

In the context of multiple layers and as is generally illustrated in FIG. 1B, note that a distinction must be drawn between the vertical velocity ratio $$\gamma_0 \equiv \bar{V}_p / \bar{V}_s = t_{s0}/t_{p0}, \quad (19)$$

where the bar indicates the average velocity, e.g., $$\bar{V}_p(z) = z/t_{p0}(z), \quad (20)$$

and the moveout velocity ratio $$\gamma_2 \equiv V_{p2}/V_{s2}, \quad (21)$$

where $V_{p2}$ is the short-spread P-wave moveout velocity, and $V_{s2}$ is the S-wave equivalent. Then, equation (5) for the C-wave vertical travel time $t_{c0}$ generalizes to $$t_{c0} = t_{p0} + t_{s0} = t_{p0}(1+\gamma_0), \quad (22)$$

with $t_{c0}$ and $t_{p0}$ being measured on corresponding reflectors. Note that this equation provides a relatively straightforward method of computing $\gamma_0$ directly from measurements taken from a multicomponent seismic data set. Then, the C-wave moveout velocity, equation (6), generalizes at every vertical time $t_{c0}$, to $$V_{c2}^2(t_{c0}) = \frac{V_{p2}^2}{1+\gamma_0} + \frac{V_{s2}^2}{1+1/\gamma_0} = \frac{V_{p2}^2}{1+\gamma_0}\left(1 + \frac{1}{\gamma_{\mathit{eff}}}\right) \quad (23)$$

where $$\gamma_{\mathit{eff}} = \gamma_2^2 / \gamma_0 \quad (24)$$

This simple expression for C-wave moveout velocity (i.e., $V_{c2}^2(t_{c0})$) is algebraically equivalent to the much more complicated-appearing expression for migration velocities within isotropic layers (although it is also valid as written here for anisotropic layers) derived previously by Harrison, M., and R. Stewart, 1993, in "Poststack migration of P-SV seismic data", Geophysics, 58(8), 1127–1135, the disclosure of which is incorporated herein by reference, for isotropic layers, and is valid as written for anisotropic layers. It is important to note that there are really only two independent parameters among $\gamma_{\mathit{eff}}$, $\gamma_0$, and $\gamma_2$: given any two the third is uniquely specified. Thus, the instant invention is, in reality, a two-parameter method of processing converted wave data, an approach which has not heretofore been recognized.

Alternatively, equation (23) may be re-arranged to read as follows:

$$\gamma_{\mathit{eff}} = [(1+\gamma_0)(V_{p2}^2/V_{c2}^2) - 1]^{-1} \quad (25)$$

It should be noted that the inclusion of layering and polar anisotropy via the separate definition of the vertical velocity ratio, $\gamma_0$, and the moveout velocity ratio, $\gamma_2$, and in particular their combination into the effective velocity ratio, $\gamma_{\mathit{eff}}$, represents a new approach to C-mode seismic data processing. In more particular, the existence and importance of $\gamma_{\mathit{eff}}$—and its role in multi-layer converted mode seismic processing—has not previously been recognized and appreciated. Although a similar parameter was described by Chung and Corrigan, Expanded Abstracts, Society of Exploration Geoph. Convention, 602–604, 1985, within the restricted context of simple synthetic seismic modeling, the generality and applicability of the instant invention far exceeds that taught previously.

The principal importance of the parameter $\gamma_{\mathit{eff}}$ is that it may be used as part of a systematic approach to processing converted mode seismic data that is superior to that available previously. Additionally, it should be noted that the effective velocity ratio defined above is, in actuality, a function which has an implicit dependency on time (or depth). In the text that follows the term effective velocity ratio will be used to refer to an effective velocity ratio function in which $\gamma_{\mathit{eff}}$ preferably takes different values as a function of depth (or time). The same may be said with regards to the vertical velocity ratio, $\gamma_0$ and the moveout ratio $\gamma_2$.

Finally, it should be noted that the essence of the disclosure presented in the previous paragraphs is that the instant inventor has developed a compact two-parameter representation of the location of seismic conversion points in the subsurface for layered anisotropic media. Although the previous equations nominally depend on three parameters $\gamma_{\mathit{eff}}$, $\gamma_0$, and $\gamma_2$, in reality there are only two independent parameters among these three quantities (e.g., see equation (24) supra). Thus, specification of any two of these parameters additionally determines the third. Similarly, each of the other three-parameter models discussed herein—the time/velocity-associated parameters ($c_0$, $c_2$, $c_3$) of equations (26) to (29), and the depth-associated parameters ($C_0$, $C_2$, $C_3$) of equations (27), (40), and (18)—contain only two independent parameters. Additionally, among the nine parameters ($\gamma_{\mathit{eff}}$, $\gamma_0$, $\gamma_2$, $c_0$, $c_2$, $c_3$, $C_0$, $C_2$, $C_3$) there are actually only two independent quantities because of the various interrelationships between these parameters (e.g., see equations (27)–(29), and compare equations (17) and (26)). Thus, in order to practice the instant invention it is only necessary to select or specify two independent parameters chosen from the nine.

Multiple Layer Converted Mode Stacking Using $\gamma_{\mathit{eff}}$

In order to perform proper stacks and velocity analyses of converted mode seismic data using conventional velocity analysis and stacking software, the data are preferably formed first into CACP gathers and then further processed into CCP gathers, at which point conventional stacking may be applied. In the preferred embodiment, and as described in more detail below, the method for forming the CACP gathers depends on the calculated value of the effective velocity ratio, $\gamma_{\mathit{eff}}$.

Note that, for purposes of this embodiment, all of the necessary subsurface parameters will be assumed to be known quantities. However, methods for determining the various parameters introduced in the following equations will be considered in subsequent sections of this disclosure.

Note that the C-wave conversion point offset (14) for multiple anisotropic layers may be generalized as follows:

$$x_c(x, t_{c0}) \approx x \left[ c_0 + \frac{c_2 \left(\frac{x}{t_{c0}V_{c2}}\right)^2}{(1+c_3(x/t_{c0}V_{c2})^2)} \right] \quad (26)$$

with $$c_0 = \lim_{x \to 0} \frac{x_c}{x} = \frac{x_{c0}}{x} = \frac{1}{1+1/\gamma_{\it eff}}, \quad (27)$$

$$c_2 = \frac{\gamma_{\it eff}}{2\gamma_0}(\gamma_{\it eff}\gamma_0 - 1)\frac{(1+\gamma_0)}{(1+\gamma_{\it eff})^3}, \quad (28)$$

and $$c_3 = c_2/(1-c_0). \quad (29)$$

The previous result for the ACP, i.e., $c_o$, appears in Gaiser, J. E., 1997, "3-D Converted Shear Wave Rotation with Layer Stripping", U.S. Pat. No. 5,610,875, the disclosure of which is incorporated herein by reference. Gaiser describes the velocity $V_{s2}$, which is imbedded within $\gamma_{\it eff}$, as the shear "rms velocity" (referring in context to the vertical velocity structure). It will be demonstrated hereinafter that it is, in fact, more general than that.

In a CACP gather, the actual conversion points $x_c(x,t_{c0})$ are smeared along a subsurface interval, as shown by example in FIG. 4, according to source-receiver offset and the depth to the reflector. The higher amplitudes are normally concentrated near the end of this smear (or near both ends, if the gather is split-spread), because the normal-incidence conversion coefficient is relatively small, and grows with increasing angle. This smear may be acceptable for the purpose of determining the velocity parameters (depending on the lateral variation of velocity), but it is clearly unacceptable for purposes of imaging. In fact, the shallower reflection events should actually image away from the CACP, at significantly greater source-receiver offsets. Hence, a smeared, inaccurate image would result if a time-flattened CACP gather were to be simply added together, at every time point, as with P-waves.

Figure 12:
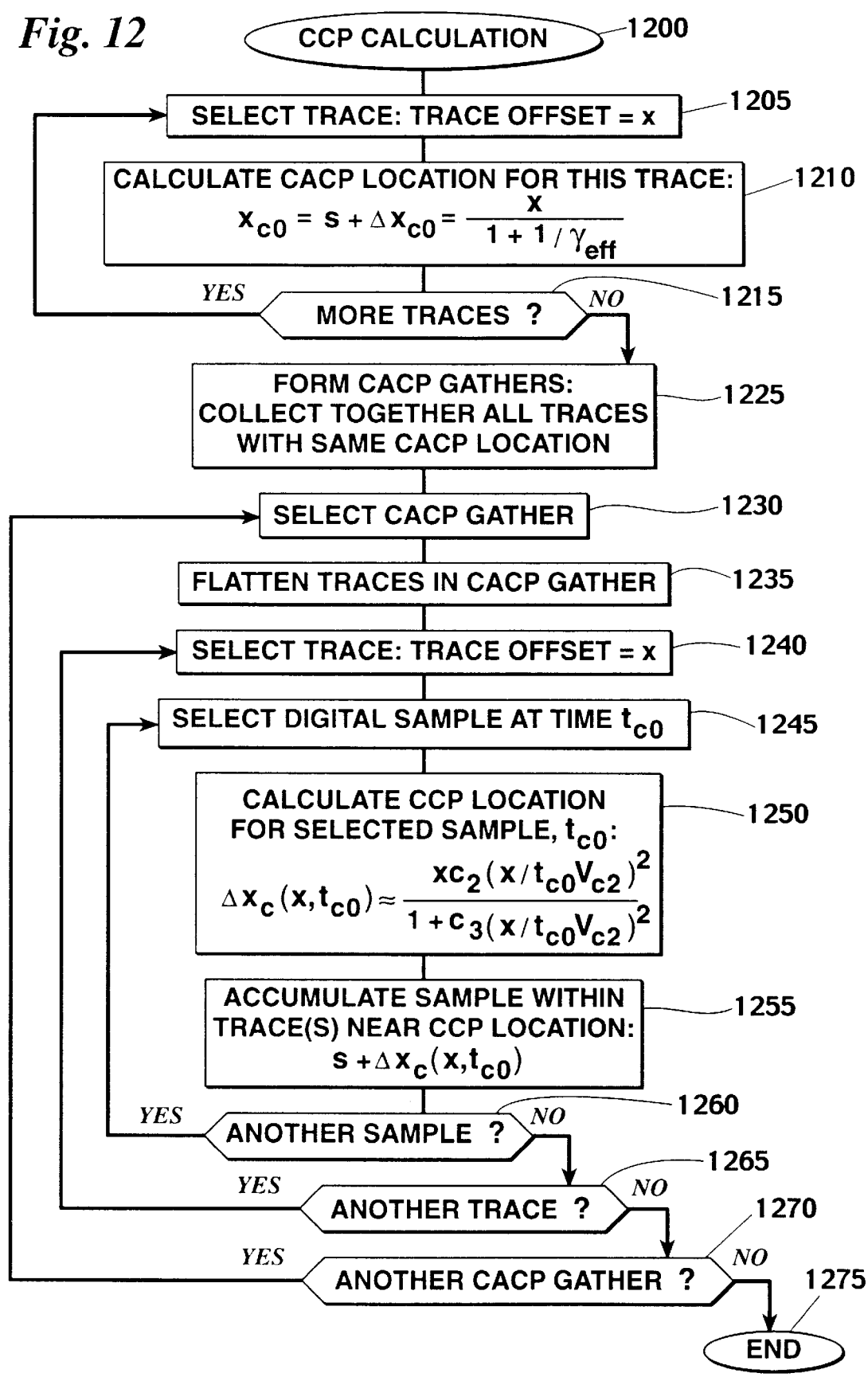
FIG. 12 is a flow chart that illustrates the principal steps in the method of CCP calculation as taught by the instant invention.

A procedure for forming proper (i.e., unsmeared) CCP gathers, based on equation (26), is easy to implement, and is more general in its applicability than alternative methods suggested by others in the past (FIG. 12). As a preferred first step, CACP gathers are formed via equation (27) by associating each trace with an asymptotic conversion point, $x_{co}$, which is calculated as follows:

$$x_{c0} = \frac{x}{1+1/\gamma_{\it eff}}$$

where "x" is the actual offset of each trace from its shot (step 1210) and $\gamma_{\it eff}(t_{c0})$ is determined at the primary target level. Then, if all of those traces with a common (or nearly common) asymptotic conversion point are collected together, a new CACP gather is formed. This operation has the effect of "relocating" each trace to a new location which is—at least in theory—the asymptotic conversion point for that trace. Needless to say, a value of $\gamma_{\it eff}$ that is reasonably accurate will tend to produce better results in the steps that follow.

Next, the seismic reflections contained within the CACP gathers are at least approximately flattened in time, i.e., corrected for moveout so that all reflections have the same (or nearly the same) zero-offset arrival time (step 1235). This might be done in many ways, but a preferred method involves estimating a velocity function from one or more CACP gathers using a conventional (e.g., semblance-type) velocity analysis. Then, application of the moveout associated with that function will at least approximately flatten the reflections.

Given a flattened CACP gather located at a CACP position $s+x_{co}$, (see FIG. 6), then as described previously, each trace in that gather with a finite total offset x will have signal amplitudes $s_{xco}(x, t_{c0})$ at each flattened time $t_{c0}$, which reflected so as to arrive at some other offset (not $x_{co}$). However, a "true" CCP gather may be constructed by defining a new array of signal amplitudes $s_{xc}(x, t_{c0})$ referred to true conversion points $x_c$ which are offset from the CACP (in the direction of the receiver) by the amount $$\Delta x_c(x, t_{c0}) \approx \frac{xc_2\left(\frac{x}{t_{c0}V_{c2}}\right)^2}{(1+c_3(x/t_{c0}V_{c2})^2)} \quad (30)$$

(step 1250). Note the hidden dependence in the previous equation on $\gamma_{\it eff}$ through the parameters $c_2$ and $c_3$. Additionally note that the offset $\Delta x_c$ is preferably measured as a displacement from the ACP (step 1210), rather than from the CACP of the gather, which will typically be located several meters distant.

Figure 6:
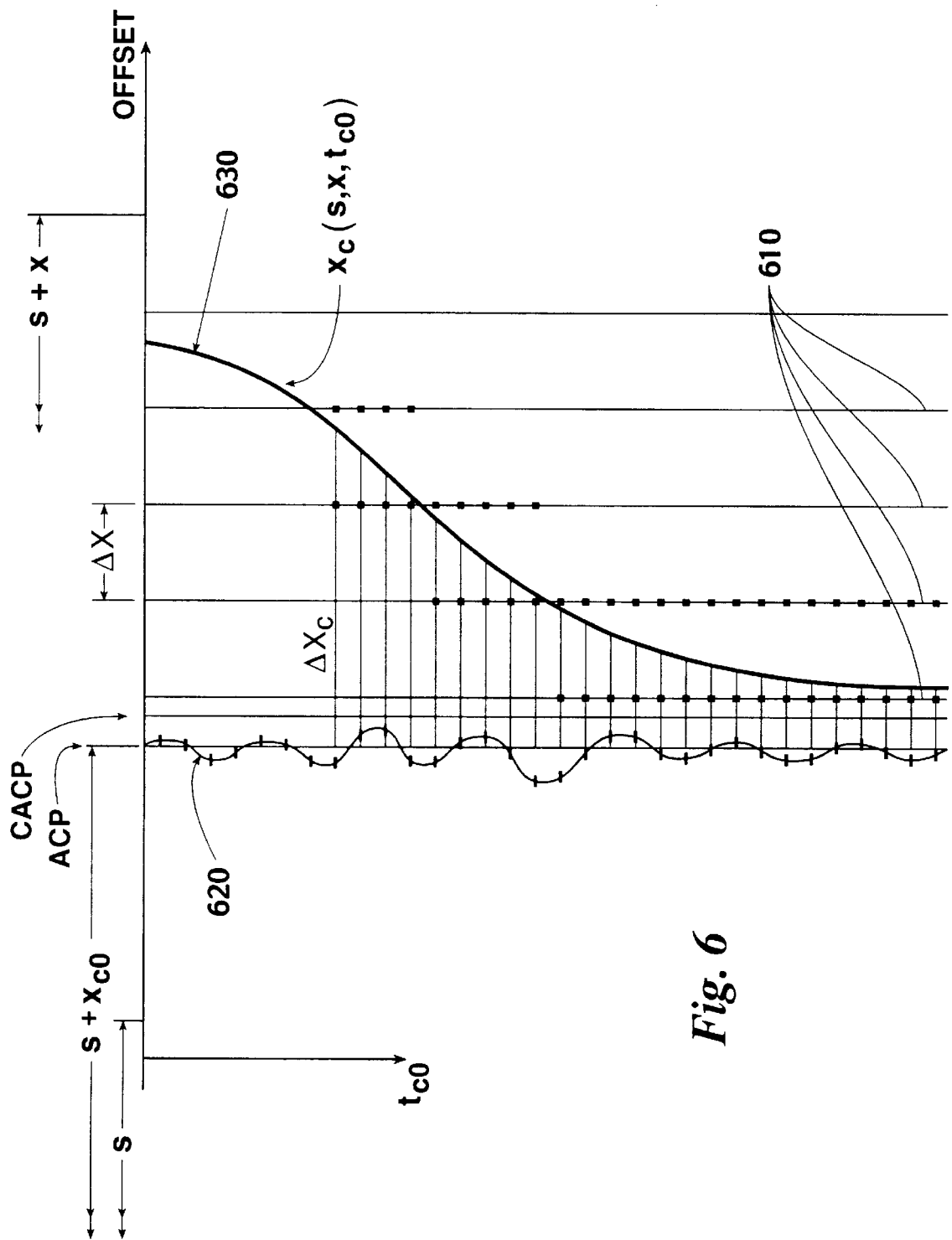
FIG. 6 illustrates how a CCP gather is formed from a collection of CACP traces.

In general, this computed conversion point will lie between the discrete positions where new traces are to be calculated. Hence, interpolation to those discrete points, will be necessary, with different weights potentially being used for each offset, and each time, according to the distance to the two nearest discrete points. A preferred way of implementing this process is schematically illustrated for a 2D case in FIG. 6. In that figure, a collection of "empty" traces 610 have been assembled which have been assigned offsets that have regular trace separation $\Delta X$. These empty traces will eventually contain the calculated true CCP traces which are preferably filled as follows. A first CACP position is selected and, with it, all traces with sources and receivers such that their ACP lies tolerably near to that CACP point (e.g., in the same bin). Then for each trace 620 within the selected CACP gather, and for each sample in that trace, that sample's two way C-wave zero offset travel time, $t_{c0}$, is used together with the trace offset x in equation (30) to compute a new trace offset $x_c$ (curve 630) for that single time point. The calculated offset, of course, will probably not correspond to one of the pre-selected offsets in the CCP gather under construction. In that case, the amplitude could preferably be divided between the two neighboring traces, proportionally to their separation. If another sample from another CACP yields an offset $x_c$ in the same neighborhood, this interpolated amplitude is preferably accumulated, along with the first and any subsequent amplitudes, to construct the CCP trace. Those skilled in the art will recognize that there are many other means of assigning the relocated amplitudes to a trace, and that the exact means by which this assignment is done is not important to the operation of the instant invention. As is generally illustrated in FIG. 6, preferably each sample in the first selected CACP trace 620 is "moved" to a new location among the CCP traces. This operation produces a collection of new CCP traces at the specified offsets. By repeating this procedure for several different CACP traces and reassociating the calculated traces into gathers having the same offset range, true CCP gathers are produced that can be subsequently stacked or otherwise analyzed.

These true flattened CCP gathers then represent computed traces which are similar to flattened CMP traces; every amplitude at every time and offset refers to reflections beneath a single surface point $x_c$. Hence, they may be summed together ("stacked") or otherwise analyzed as is normally done with flattened CMP gathers. This approach represents a significant refinement of the procedure taught by Tessmer and Behle, 1988, cited previously, since it is valid for layered, anisotropic media. Additionally, the unstacked CCP gather is available for "AVO" analysis, as discussed below.

Remember that evaluation of equation (30) and, hence, the proper construction of true CCP gathers requires knowledge of at least two independent parameters of the nine mentioned previously, but preferably involves a determination of $\gamma_{\mathit{eff}}$, $\gamma_0$, and $V_{c2}$ for each time point in the trace, $c_0$, $c_1$, and $c_2$ then being defined by the choices of $\gamma_{\mathit{eff}}$ and $\gamma_0$ (equations (27), (28), and (29) ). Methods of estimating these (and other) parameters will be discussed in the next section.

Multiple Layer Converted Mode Processing Using $\gamma_{\mathit{eff}}$

Figure 5A:
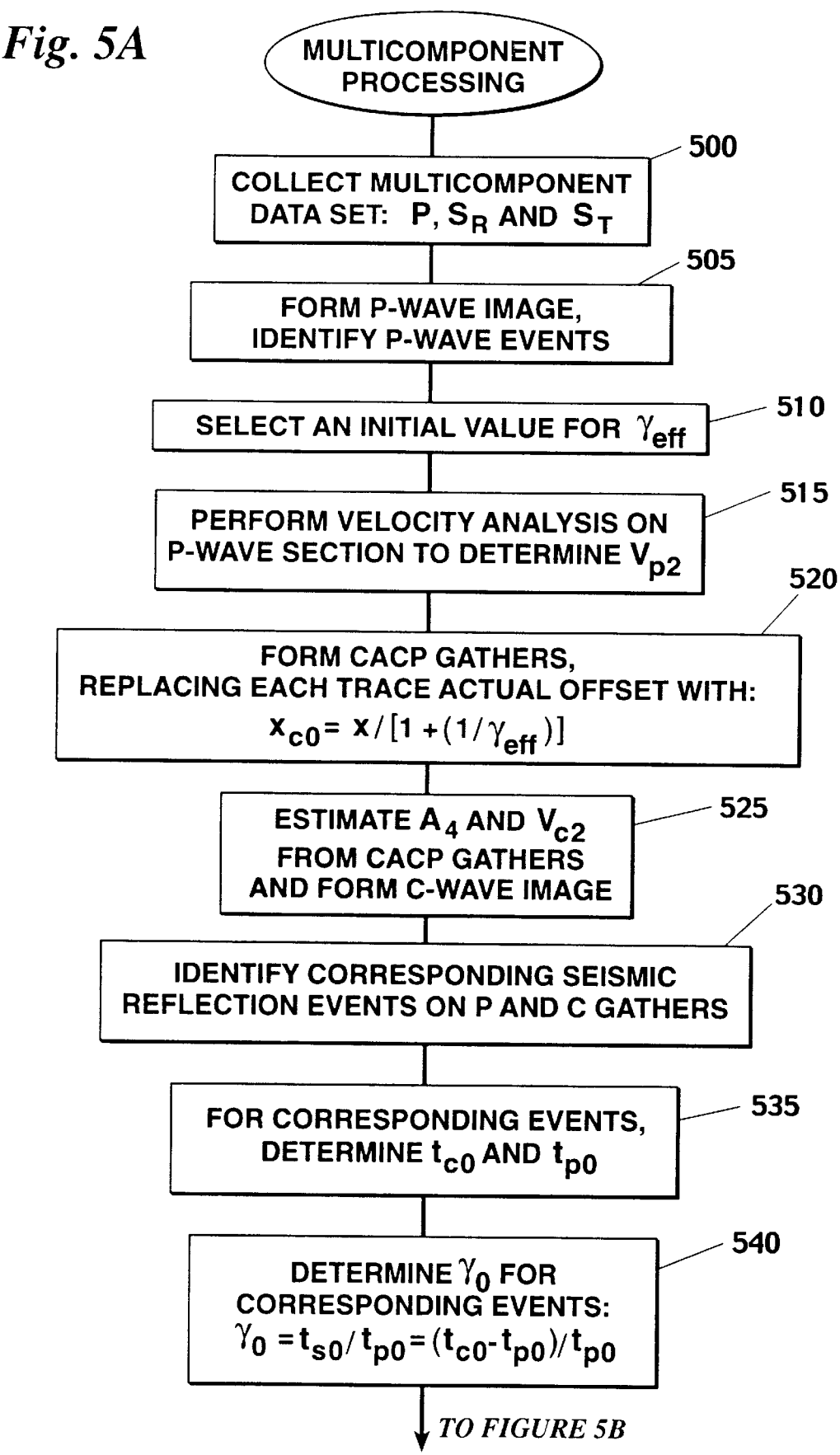
FIGS. 5A and 5B is a flowchart that illustrates the principal steps in a preferred embodiment of the instant invention.
Figure 5B:
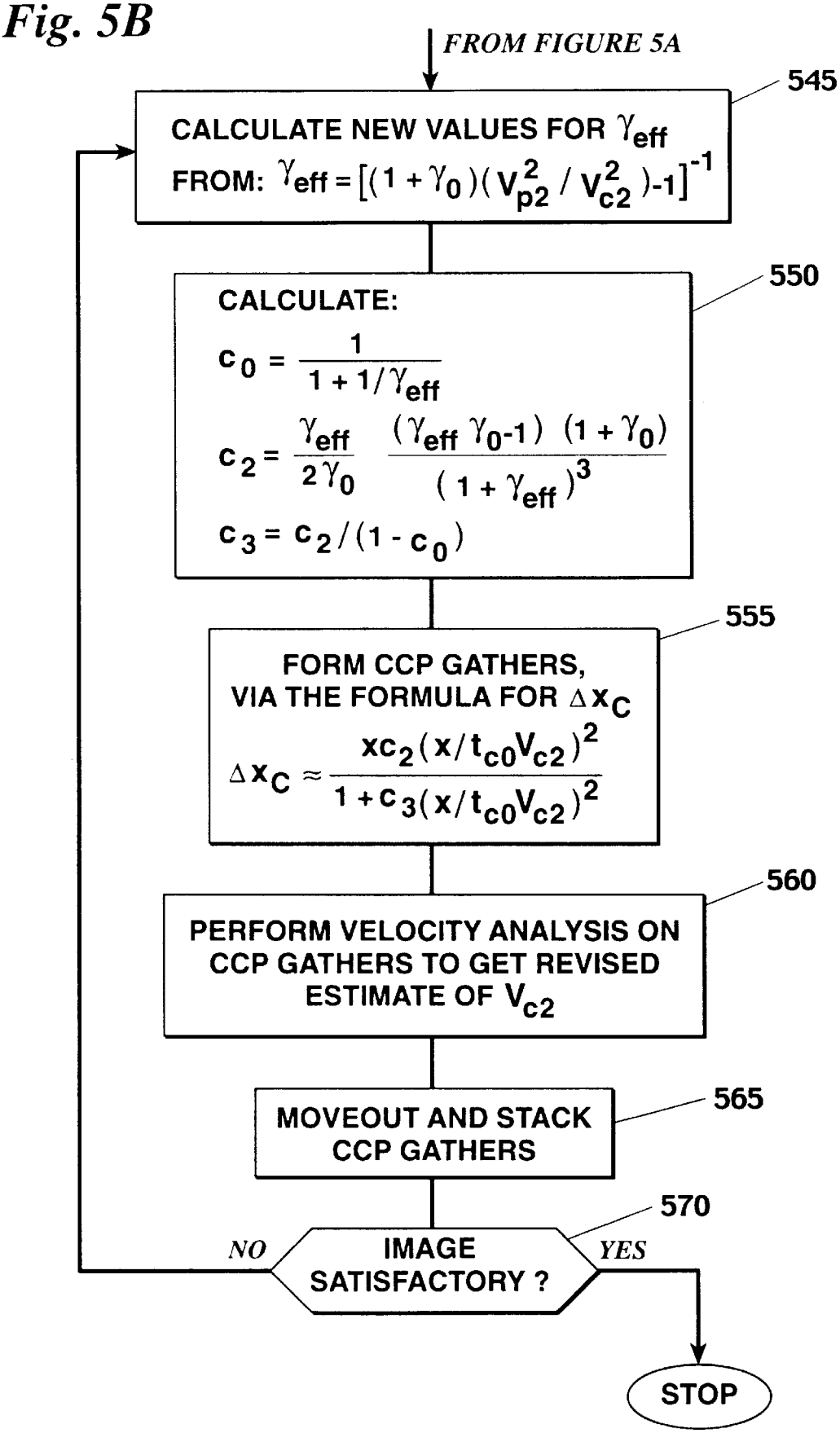

In practice and as is generally illustrated in FIG. 5, the starting point for the instant embodiment will be an unstacked P-wave seismic data set and a corresponding converted-wave multicomponent seismic data set which have preferably been acquired according to standard procedures well known to those skilled in the art (step 500). As a preferable next step 505, an initial interpretation is performed, wherein CMP gathers are used to construct P-wave images, and to identify P-wave reflections. Then, CACP gathers are used to identify converted-wave reflections, with the reflectors so identified being used subsequently to, among other things, estimate the subsurface velocities of P and C waves.

As was indicated previously (e.g., in connection with equation (26)), the process of forming a CACP gather requires a knowledge of $\gamma_{\mathit{eff}}$. But, of course, at the start of the analysis $\gamma_{\mathit{eff}}$ is not usually known, so the instant method is preferably an iterative one. In the first iteration, the practitioner specifies an initial estimate for $\gamma_{\mathit{eff}}$, an estimate that must necessarily be based on prior experience (step 510). Selection of this initial estimate is not difficult for those skilled in the art, and a satisfactory choice for the initial value will usually lie between 2.0 and 3.0 and may vary with lateral position. However, the instant method is fairly robust with respect to the choice of the initial value and that value will be refined as part of the steps that follow.

Given an estimate of the effective velocity ratio, the asymptotic conversion point for a given source-receiver configuration may be calculated (equation (27)). As discussed previously, this does not locate the actual conversion point for any particular reflector. However, it does serve as a reference point and one may sort the data to select all source-receiver pairs with ACP's at (or tolerably near) this ACP, thereby forming a CACP "gather". Note that this gather might potentially contain a variety of offsets and similar conversion/reflection points.

Figure 9A:
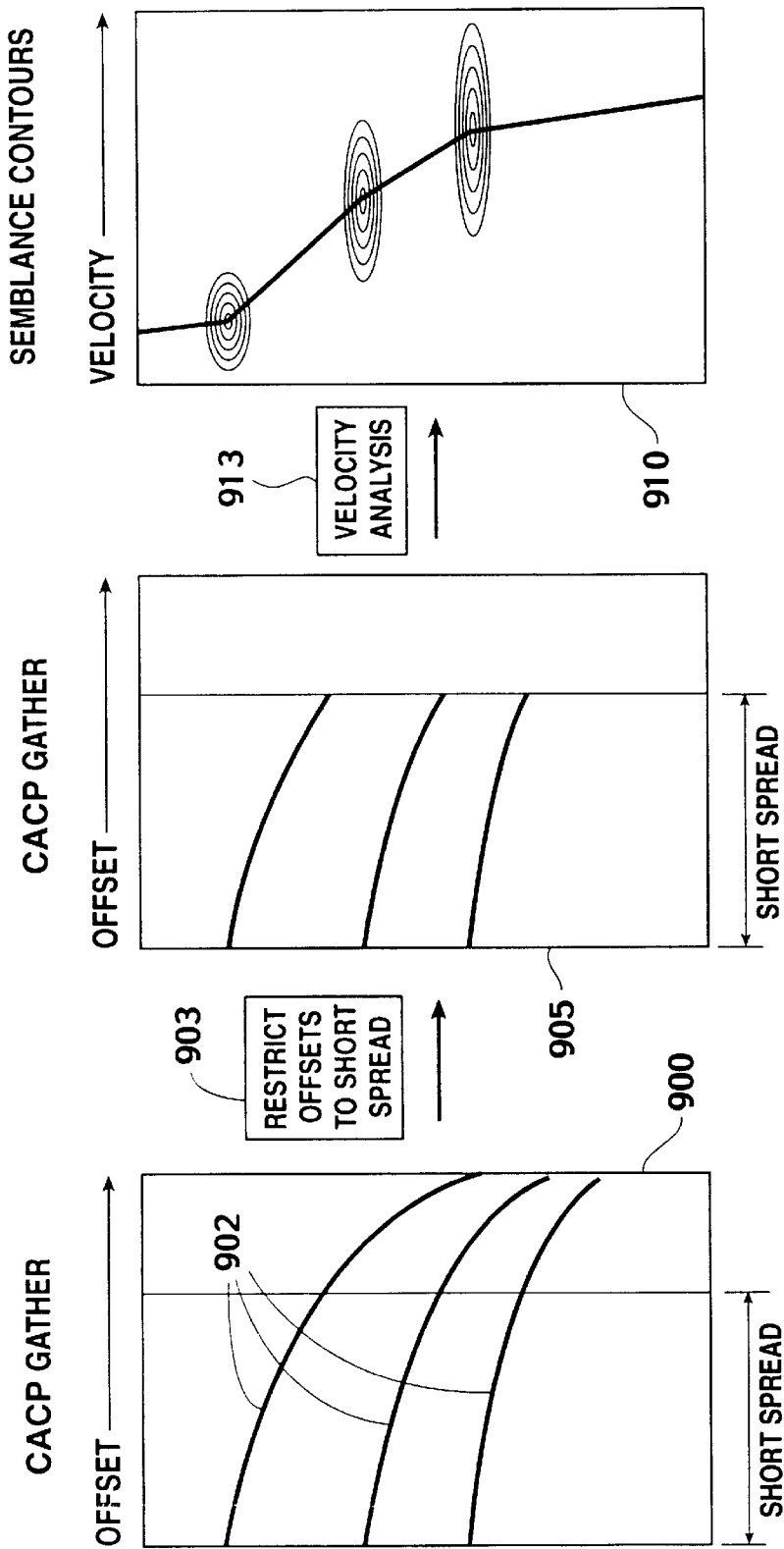
FIGS. 9A and 9B contains a schematic illustration that shows how the parameter $A_4$ can be used to flatten a gather that contains residual moveout in the long offsets.

As is generally illustrated in FIG. 9A, each CACP gather may next be used to provide first-pass estimates of the moveout parameters—$V_{c2}$ and $A_4$ in equation (8)—as follows. In preferred step 913, a conventional velocity analysis is applied to the short-spread traces to estimate $V_{c2}(t_{c0})$ as a function of CACP position. A conventional velocity analysis, such as semblance maximization, constant velocity stacks, manual flattening, etc, is appropriate because the moveout on the short-spread traces is usually approximately hyperbolic. This step will be referred to hereinafter as "flattening the near and mid-offset gather" for all times $t_{c0}$, the "flattening" operation being applied to coherent reflections on the selected seismic traces.

Velocity analysis is preferably applied only to the short-spread traces because, in some cases, non-hyperbolic moveout may be evident on the traces associated with the far offsets. A "far" or "long" offset is a relative term that will be taken to mean the offset associated with a seismic trace that contains a reflection event that originates from a rock unit that is shallower than the offset of that trace. Thus, a seismic trace might be considered a far offset trace with respect to some reflectors, but not for others. This effect will normally evidence itself when it is impossible using any velocity function, $V_{c2}(t_{c0})$, to flatten some reflection events. In such a case, the long offsets are simply excluded from this stage of the analysis (for example by "muting" them, as that term is known and used in the art). In effect, by restricting the analysis to near and mid-offsets, the value of $A_4(t_{c0})$ is effectively rendered irrelevant.

Figure 9B:
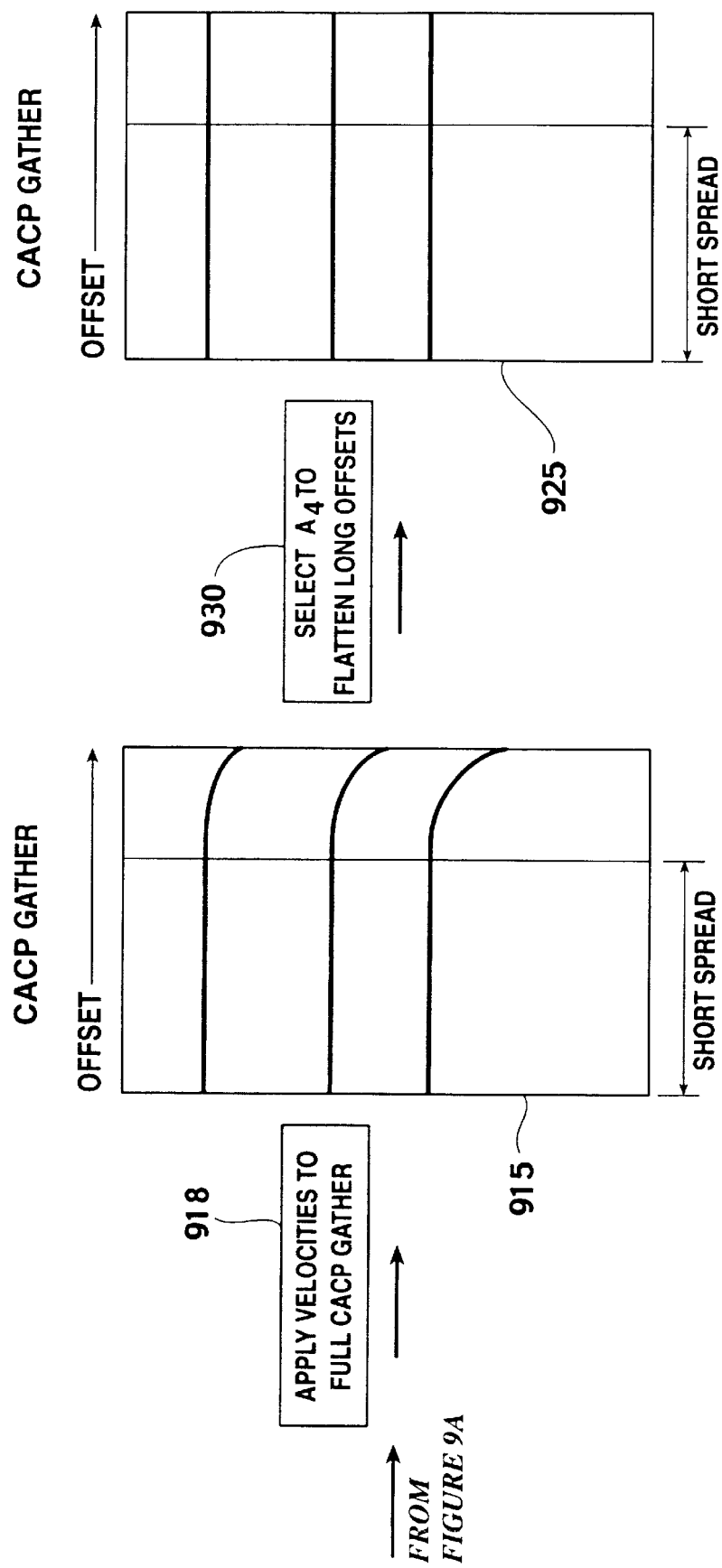

Then, if non-hyperbolic moveout is evident on the traces, a second-stage analysis is preferably conducted. In this stage, the velocities $V_{c2}(t_{c0})$ are held constant and more traces are included with the near-mid offset trace gather. i.e., traces having longer offsets and containing reflections that may not have been successfully flattened by the velocities used in the previous step (915). The new traces are preferably moved out at the same velocities determined previously from the short-spread CACP gather (step 918, FIG. 9B) before combining them therewith.

In the event that there is still residual moveout in the long offset traces, then the value of $A_4(t_{c0})$ in equation (8) is chosen so as to flatten—at least as nearly as possible—the reflections on these farther offsets. The value of $A_4$ is related to the amount of moveout on a trace via the normal moveout equation, and equations (8) and (9):

$$\Delta t_{nmo} = t_c(x) - t_{c0}$$

$$= \sqrt{t_{c0}^2 + \frac{x^2}{V_{c2}^2} + \frac{A_4 x^4}{1 + A_5 x^2}} - t_{c0}$$

After substituting for $A_5$ from equation (9), the previous expression becomes:

$$\Delta t_{nmo} = \sqrt{t_{c0}^2 + \frac{x^2}{V_{c2}^2} + \frac{A_4 x^4}{1 - \frac{A_4 V_{c2}^2}{1 - \frac{V_{c2}^2}{V_{p2}^2}} x^2}} - t_{c0}$$

$$= \sqrt{t_{c0}^2 + \frac{x^2}{V_{c2}^2} + \frac{A_4 x^4 (V_{p2}^2 - V_{c2}^2)}{V_{p2}^2 - V_{c2}^2 - A_4 V_{c2}^2 x^2 V_{p2}^2}} - t_{c0}$$

where $\Delta t_{nmo}$ is the amount of moveup to apply to a digital sample located at time $t_c$ on a CACP trace with offset x. Thus, by choosing different values of $A_4$ and applying the moveout determined thereby to the long offset CACP traces, a particular value may be determined that most nearly flattens the gather (925 and 930, FIG. 9B), as measured by semblance or other techniques. The previous process is then repeated for all ACP points. With the gathers so flattened, a converted-wave stacked image can then be formed, preferably using the techniques described in the previous section.

Note that the steps discussed above do not require that a correspondence be established between converted-wave reflection arrivals and P-wave arrivals. Nor do they require an accurate—or even very realistic—estimate of $\gamma_o(t_{c0})$. Even the supposition that a given converted-wave event is a C-wave (as opposed to some other converted mode) is not strictly required in most cases, as the steps that follow are sufficiently robust to accommodate even occasional misclassification of an event. However, at the next step a correspondence between event types will be established and mode identifications will be made or refined.

An initial correspondence must next be made between selected P-wave arrivals and converted-wave arrival (step 530, FIG. 5A). This might be done in many ways using various interpretive procedures well known to those skilled in the art. For example, corresponding reflectors on the P-wave and converted sections might be identified or "picked," each reflector so-picked providing estimates of two-way vertical travel time to the same reflecting boundary. Further, this may be done using corresponding P-wave and converted wave flattened gathers, or, alternatively, using a processed P-wave image and a converted-wave "image" constructed from the respective flattened gathers produced by the previous step and using the (ultimately inadequate) procedures taught by Tessmer and Behle, 1988, cited previously. Establishing the reflector correspondence between the P-wave and converted-wave data sets may be subject to some interpretation, but is not usually a problem in the case of major reflectors; it may, however, pose a difficulty on a finer scale. Fortunately, it is the grosser-scale correspondence that is more crucial for velocity ratio determination.

In order to establish the P-wave/converted-wave correspondence, it may be necessary to assume the mode of conversion of one or more reflection events (e.g., whether the reflection is a true C-mode event, or whether conversion took place at some other part of the ray path). If an incorrect mode identification is made, that fact will become apparent in the following steps, as inconsistencies will arise. For purposes of specificity in the text that follows, it will be assumed that the arrivals of interest are true C-mode events, and have been properly identified as such at this stage.

After a few corresponding events have been tentatively identified, their zero-offset arrival times $t_{po}$ and $t_{c0}$ can be measured (step 535), and the vertical velocity ratio function $\gamma_o$ (cf. equation (19)) can be tabulated (and interpolated between tabulated points, if desired) (step 540). Similarly, the corresponding velocity functions $V_{p2}$ and $V_{c2}$ may be tabulated and interpolated. The function $\gamma_2(t_{c0})$, as defined in equation (21), may then be estimated using the tabulated/interpreted values.

Finally, $\gamma_{eff}$ may now be computed per equation (25) at each tabulated and/or interpreted point using the $\gamma_2$ and $\gamma_o$ velocity ratio functions at corresponding zero-offset travel times and places (step 545). Alternatively, equation (25) may be used to produce the same result. Given these new values of $\gamma_{eff}$, a second iteration may be undertaken, beginning with the calculation of CACP gathers (steps 550 and 555) and continuing through the re-estimation (if necessary) of the $\gamma_{eff}$ function. In this iteration, the various velocities involved in the expressions for $\gamma_{eff}$ and $\gamma_o$ may be recalculated for use in subsequent imaging stacks of the P-wave and C-wave data (step 565). This iterative process should converge in one or two cycles; if not, the cause could be that the converted-wave data identified previously as true C-mode reflections, may have been other modes that were misidentified.

Example Computation Using $\gamma_{eff}$

As an example of the use of the equations developed previously, consider the following calculations from an actual ocean bottom seismic survey. In this particular survey, the ratio of vertical velocities (equation (22)) yielded an estimate of $\gamma_0$ equal to 2.9, and the ratio of moveout velocities (equations (21) and (24)) was $\gamma_2=2.4$, which results in an estimated value for $\gamma_{eff}$ of 2.0. By ignoring the possible effects of multiple layering and anisotropy, the ACP would be calculated from the ratio of vertical travel times $\gamma_0$ to be located at:

$$\frac{x_{c0}}{x} = \frac{1}{1+1/\gamma_0} = \frac{1}{1+1/2.9} = 0.74.$$

Said another way, the ACP is located 74% of the distance from the shot to the receiver. Similarly, by naively using the moveout velocity ratio $\gamma_2$ in the previous calculation the calculated ACP would be located about 70% of the way from the shot to the receiver. That is,:

$$\frac{x_{c0}}{x} = \frac{1}{1+1/\gamma_2} = \frac{1}{1+1/2.4} = 0.70$$

However, if the effective ratio $\gamma_{eff}$ for the conversion point is properly calculated, the ACP is found to be:

$$\frac{x_{c0}}{x} = \frac{1}{1+1/\gamma_{eff}} = \frac{1}{1+1/2.0} = 0.66.$$

This value represents a significant difference from the naive and conventional approximations used previously in the art, and may amount to several hundred meters at the furthest offsets. Finally, note that in none of the previous cases was the ACP near 0.5, which is the midpoint between the shot and the receiver.

Seismic Acquisition and $\gamma_{eff}$

Figure 11:
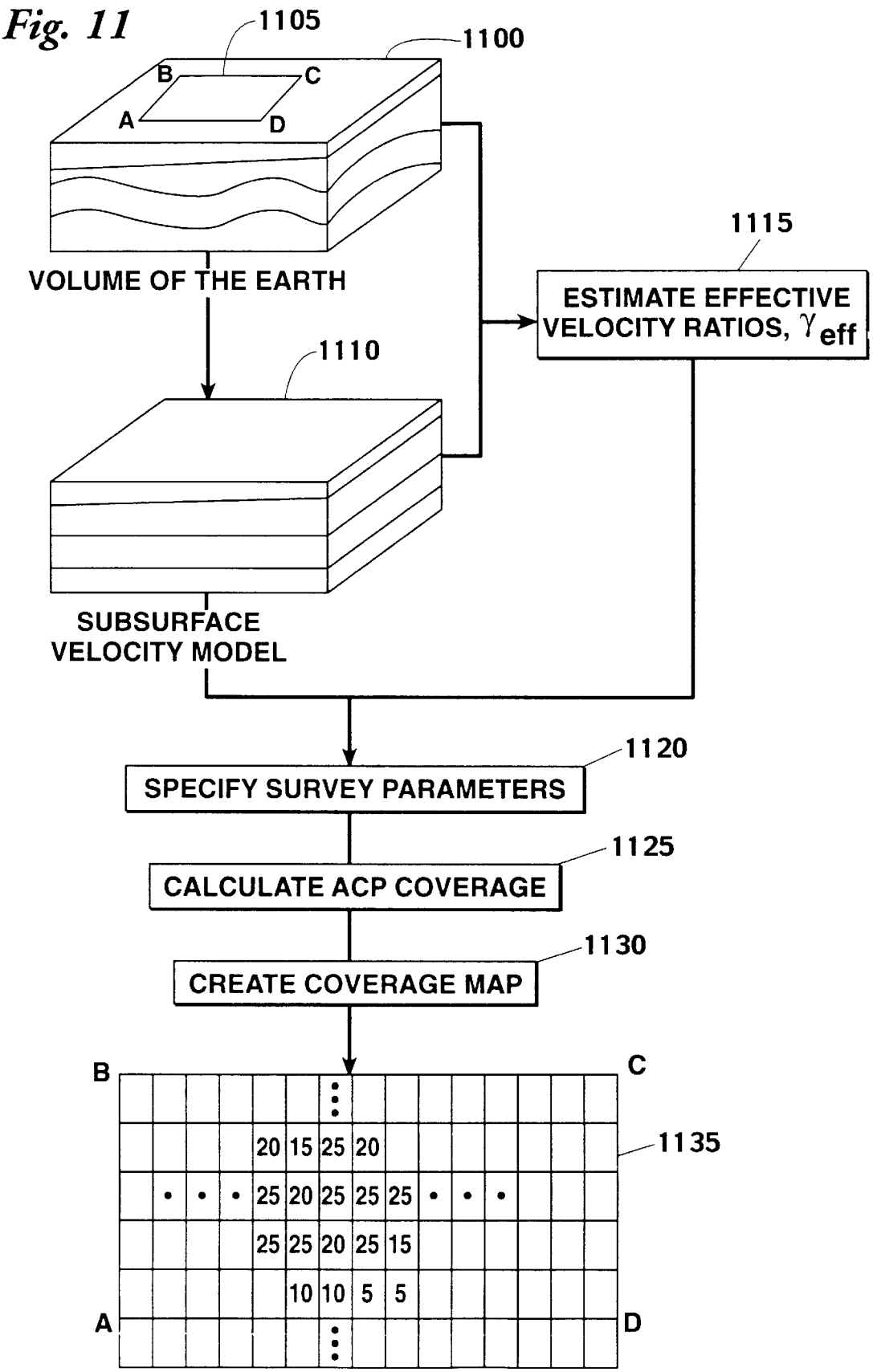
FIG. 11 illustrates generally how the parameter $\gamma_{eff}$ is used to select field parameters during the planning of a seismic survey.

According to another aspect of the instant invention and as is generally illustrated in FIG. 11, there is provided a method of analyzing and processing seismic data that is appropriate for use in the predetermination of seismic survey acquisition parameters in C-wave seismic surveys. By way of general background, it is customary as part of the planning of a seismic survey to conduct pre-survey seismic modeling studies, the purpose of which are to test the proposed acquisition parameters against the expected subsurface geology to insure that data collected during the survey will yield acceptable coverage over the region of exploration or exploitation interest. Since the cost of acquiring even a small converted wave seismic survey can run into the hundreds of thousands of dollars or more, there is an enormous incentive to take steps—such as modeling—to insure the integrity of the survey and to impose some measure of quality control over the choice of the various survey parameters. The results of these modeling studies are then used to guide the selection of field parameters that are used in the actual seismic survey.

It is customary, as part of these modeling studies, to produce various diagnostic charts and displays that indicate the geographic distribution, density, and other statistical features of the planned multiplicity of rays that will be imaging the subsurface, thereby making it possible for the explorationist to be have some confidence that the exploration target will be adequately imaged. Statistics that are useful for purposes of the instant invention might include, by way of example only, the number, the azimuth, the incidence angle of such multiple rays and, conventionally, the expected CMP fold.

However, in the case of 3D C-wave acquisition, consideration of the CACP fold—as opposed to the CMP fold—is important to adequately define the full-fold, well-imaged area of a seismic survey, and to minimize the impact of the "acquisition footprint". Of course, the ACP, $x_{c0}$ as calculated from equation (27) using $\gamma_{\mathit{eff}}$, should be used in this computation and for the determination of the expected C-mode fold resulting from the forthcoming survey.

In practice $\gamma_{\mathit{eff}}$ would preferably be used in multicomponent survey design as follows. As an initial step, a subsurface target and an associated region on the surface of the earth above it (FIG. 11, 1105) are selected. A proposed survey geometry is then selected (step 1120), the survey geometry preferably specifying acquisition parameters such as shot spacing, receiver group spacing, receiver array length, desired fold, desired survey frequency bandwidth, etc. More importantly for purposes of the instant invention, a geologic model of the subsurface beneath the region of interest 1110 is also constructed. At minimum, the geologic model should include a rough estimate of the configuration of some of the major subsurface structural and stratigraphic features ("structural features" collectively, hereinafter), preferably including the target horizon(s), beneath the location of the proposed survey, and the velocities associated with those features (i.e., a subsurface velocity model is constructed). Preferably, the subsurface velocity model should include estimates of both P-wave and shear velocities. If only P-wave velocities are specified by the explorationist, the shear velocities can be estimated therefrom using procedures well known to those skilled in the art.

As a next step, an estimated value of $\gamma_{\mathit{eff}}$ is obtained at as many points within the survey area as is feasible (step 1115), which values might be obtained from the velocity model, well logs, previous seismic surveys in the area, or from some other source. Then, using the estimated value of $\gamma_{\mathit{eff}}$, the actual fold that can be expected at each CACP in the survey is calculated using the methods discussed previously (step 1125). The results of this calculation, as is well known to those skilled in the art, might be displayed in any number of ways but it is often displayed as a map 1135 whereupon has been posted the expected ACP fold at the surface location of each CACP. It is then routine to examine that map to see if the expected CACP coverage is adequate within the region of interest of this survey, or whether one or more survey parameters (e.g., trace spacing, line spacing, shot spacing, etc.) need to be modified to increase or decrease the fold.

As has been discussed previously, in order to compute $\gamma_{\mathit{eff}}$, the C-wave moveout is needed, so an initial 2D C-wave survey over the region of interest might be necessary in some cases, in order to properly plan for the subsequent (and more expensive) 3D survey. Alternatively, C-wave moveout information from a nearby survey might also be used in some cases.

In still other cases it may be necessary to use well log or VSP data to obtain the pre-survey C-wave moveout estimate. However, if log or VSP information are used to determine $\gamma_0$—and this is used in place of $\gamma_{\mathit{eff}}$ to compute the ACP—significant shortcomings in the resulting data quality may be observed. This is because the full-fold area, and the acquisition footprint, depend upon the ACP through $\gamma_{\mathit{eff}}$, not $\gamma_0$.

In general, it is best not to compute $\gamma_{\mathit{eff}}$ from log or VSP-based C-wave moveout velocities according to methods that are conventional in other contexts, e.g., by converting average velocity values to RMS velocity values, and then constructing $V_{s2}^2$ and $V_{c2}^2$. One reason for this is that polar anisotropy also potentially contributes to these moveout velocities. Although the formulae above are valid as written even if the data contain these effects of polar anisotropy, these anisotropic effects are not included in the vertical or near-vertical data from logs and VSP's, so the computation of $V_{p2}^2$ and $V_{c2}^2$ from such input data can be expected to be imprecise.

That being said, in those cases where only log or VSP information is available, the possibly imprecise estimate of $\gamma_{\mathit{eff}}$ obtained from these data can still yield modeling results that are more accurate than those produced by conventional processing techniques.

Time-to-depth Conversion Using Converted Wave Velocities

According to still another aspect of the instant invention, there is provided a method of using the effective velocity ratio to convert C-mode seismic data from the time domain to the depth domain. Note that the formulae derived previously are presented in terms of time, rather than depth, since the arrival times are directly measurable, whereas the depths must be inferred, usually with the help of an assumption of isotropy. Time-domain processing may be performed independently of such assumptions, so it is usually best to avoid them until they are actually needed. Eventually, of course, the conversion of time to depth will typically be undertaken, if for no other reason than to provide a guide for use during the process of drilling of a well into an imaged prospect.

It is conventional wisdom that depth determination should be done with P-wave velocities rather than C-wave, but this may not always be possible in practice. In cases where P-wave seismic data is not available or unreliable, C-mode moveout velocities can be used instead. In brief, according to one preferred embodiment a modification of the Dix procedure is used to convert C-wave travel times and velocities to depths, the "Dix procedure" being a well known method—in the P-wave context—of transforming stacking velocities to interval velocities in coarse layers. Given a series of interval velocities and the travel times therethrough, the Dix procedure yields the depth to any point on the seismic section, assuming that the layers are isotropic.

Figure 10:
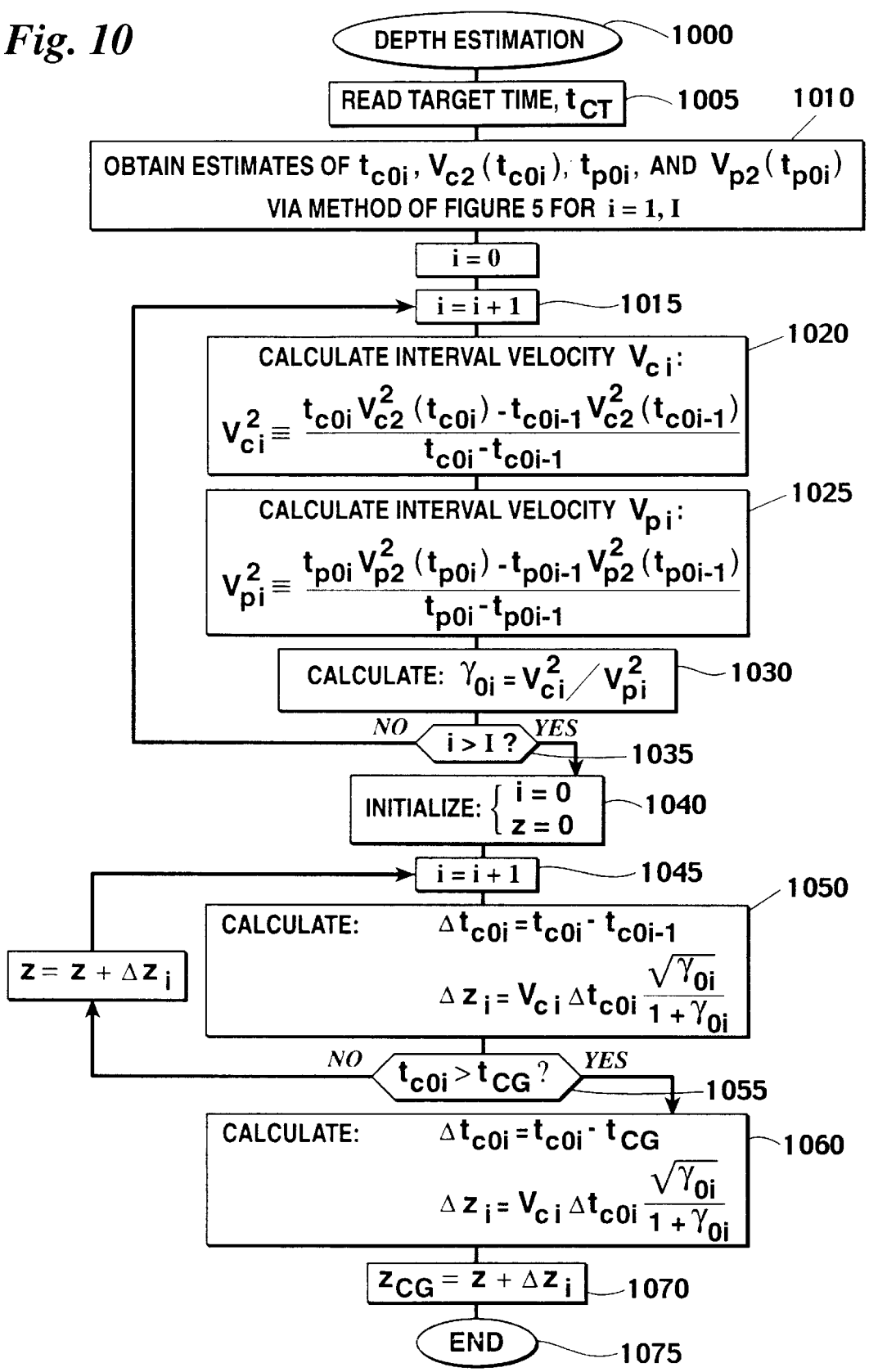
FIG. 10 is a flowchart that illustrates the principle steps involved in depth estimation using the methods disclosed herein.

Within the context of the instant invention and as is generally illustrated in FIGS. 10A and 10B, the Dix method is preferably applied as follows. As a first step, Dix differentiation is applied to the C-wave hyperbolic moveout parameter of equation (8), thereby yielding the (RMS) average C-wave velocity between two coarsely-spaced reflectors (labeled i and i−1):

$$V_{ci}^2 \equiv \frac{t_{c0i} V_{c2}^2(t_{c0i}) - t_{c0i-1} V_{c2}^2(t_{c0i-1})}{t_{c0i} - t_{c0i-1}} \qquad (31)$$

(step 1020). As noted in Al-Chalabi, 1974, "An analysis of stacking, RMS, and interval velocities over a horizontally layered ground", Geophysical Prospecting, volume 22, no. 3, p. 458, the disclosure of which is incorporated herein by reference, this equation represents an RMS average velocity throughout the coarse layer bounded by $t_{c0i}$ and $t_{c0i-1}$, rather than the arithmetic average which is strictly necessary for proper time-to-depth conversion. However, the common practice will be followed here, and these distinctions will be ignored in the context of individual layers. This leads to $$V_{ci} = \frac{V_{pi}}{\sqrt{\gamma_{0i}}}, \quad (32)$$

where $\gamma_{0i}$ is the vertical velocity ratio within the "ith" layer. The thickness of this isotropic layer is then given by $$\Delta z_i = V_{pi}\Delta t_{p0i} = V_{pi}\Delta t_{c0i}/(1+\gamma_{0i}),$$

where, $V_{pi}$ is the corresponding P-mode interval velocity over the corresponding time interval $t_{c0i}$ to $t_{c0i-1}$:

$$\Delta t_{c0i} = t_{c0i} - t_{c0i-1}$$

$$\Delta t_{p0i} = t_{p0i} - t_{p0i-1}.$$

Substituting for $V_{pi}$ yields $$\Delta z_i = V_{ci}\Delta t_{c0i}\frac{\sqrt{\gamma_{0i}}}{1+\gamma_{0i}}. \quad (33)$$

This last equation provides the basis, through repeated application, for finding the total depth to any point on a seismic section or, more typically, for converting a seismic section from time to depth.

As illustrated in FIG. 10A a target time, $t_{CT}$, is specified by the user (step 1005). This is a two-way seismic travel time for which a depth conversion is desired. Of course, in many settings it is not just the determination of a single depth that is desired, but rather a conversion of a time-section into a depth-section. In that instance, the instant method could be simply repeated for every time level, with $t_{CT}$ successively being assigned the value of each time level. Other variations are certainly possible and within the capability of one ordinarily skilled in the art.

It will be assumed, for purposes of specificity, that the quantities $V_{c2}(t_{c0i})$, $t_{p0i}$, $V_{p2}(t_{p0i})$, and $t_{c0i}$ have been previously calculated by means suggested earlier (e.g., via the method of FIG. 5). Then, the preferred embodiment continues by calculating (step 1020) the C-mode interval velocities using equation (31) and the P-mode interval velocities (step 1025) using the Dix formula (steps 1020 and 1025). Given the P-mode and C-mode interval velocities over the same interval, the quantity $\gamma_{0i}$ can then calculated, using equation (32). Note that these computations should be repeated at least until the deepest time, $t_{c0i}$, is larger than $t_{CT}$.

Given the RMS interval velocities calculated via steps 1015 to 1035, the incremental thickness of each individual unit, $\Delta z_i$, can readily be calculated via equation (33) (step 1060). Then, by adding together all of the $\Delta z_i$ above the target time, together with a "fractional" layer that accounts for the fact that $t_{CT}$ might not be coincident with a picked reflector time (step 1060), the depth to $t_{CT}$ is determined (step 1070).

It should be clear to one skilled in the art that one could use a conventional P-wave time-to-depth conversion routine, in concert with the C-wave velocities, to perform the previous calculation. However, note that the C-wave velocity function must first be stretched in time by the time-variable factor given above (equation (33)) before being given to a P-wave Dix calculation algorithm. Of course, if the layers are anisotropic, new considerations arise, as detailed below. However, even in this common case, equation (33) still provides at least an approximate method for converting time to depth using C-wave data.

Using $\gamma_{eff}$ to Detect Polar Anisotropy

According to still a further aspect of the instant invention, a method is taught whereby the parameters $\gamma_{eff}$ and $\gamma_0$ can be used as indicators of polar anisotropy in the subsurface rocks through which the seismic energy has passed.

Note at the outset that, since the parameters $c_0$, and $c_2$ depend only on the short-spread moveout parameters $t_{c0}$ and $V_{c2}$, the equations involving $\gamma_{eff}$ developed previously can be used for the most part as written in the presence of polar anisotropy, provided that it is recognized that the measured moveout velocities $V_{p2}$ and $V_{s2}$ are affected by both the layering and the anisotropy. This is fundamental, of course, since the data have these effects in them already.

Thus, the seismic parameters discussed previously lead to a proper determination of the conversion point, even if the differences between $\gamma_0$ and $\gamma_2$ arise from anisotropy as well as multiple layers. The contributions due to layering and anisotropy may be separately estimated using the detailed formulae for $V_{c2}$ given in Tsvankin and Thomsen, 1994, "Nonhyperbolic Reflection Moveout in Anisotropic Media", Geophysics, volume 59, no. 8, 1290–1304, the disclosure of which is incorporated herein by reference, although this is not usually necessary for time-domain processing.

Consider, by way of example, a simple special case, wherein the difference between the values of $\gamma_0$ and $\gamma_2$ may be completely ascribed to anisotropic effects (neglecting layering effects). In this case, the anisotropic parameter $\delta$ is simply the fractional difference between vertical and moveout P-wave velocities, $\delta$ being well known to those skilled in the art as the so-called "strange" anisotropy coefficient as defined in Thomsen, "Weak elastic anisotropy", Geophysics, v. 51, no. 10, 1986, pp. 1954–1966, the disclosure of which is incorporated herein by reference. The value of the parameter $\delta$ influences velocities of P-waves at near-vertical incidence. The corresponding anisotropy parameter for SV-waves is denoted $\sigma$, a discussion of which may be found in, for example, Tsvankin and Thomsen cited previously.

In the case of the instant example, the effective velocity ratio may be expressed in terms of the strange anisotropy factor as follows:

$$\gamma_{eff} = \gamma_2^2/\gamma_0 = \gamma_0 \frac{(1+2\delta)}{(1+2\sigma)}. \quad (34)$$

Since $\sigma$ is often greater than $\delta$, it follows that $\gamma_{eff}$ will often be less than $\gamma_0$, and this occurrence is some indication that the difference is caused by anisotropy. Thus, seismic attribute displays may be constructed that contain, for example, the difference between $\gamma_{eff}$ and $\gamma_0$ (or, alternatively, their ratio or some other measure of difference), with non-zero values (or values different from unity) suggesting the presence of polar anisotropy.

If the C-wave hyperbolic moveout coefficients $V_{c2}$ are affected by polar anisotropy, then the interval C-wave velocity, produced by the Dix differentiation, equation (31), is $$V_{ci}^2 = V_{pi}^2\left(\frac{1+1/\gamma_{ci}}{1+\gamma_{0i}}\right) \quad (35)$$

where:

$$\gamma_{ci} = \frac{\gamma_{0i}(1+2\delta_i)}{(1+2\sigma_i)} \quad (36)$$

This reduces, of course, to equation (32), if the individual layer anisotropies $\delta_i$ and $\sigma_i$ are zero. Then the layer thickness becomes $$\Delta z_i = V_{ci}\Delta t_{0i}[(1+\gamma_{0i})(1+1/\gamma_{ci})(1+2\delta_i)]^{-\frac{1}{2}} \quad (37)$$

This method could readily be implemented according to the general steps suggested in FIGS. 10A and 10B, with appropriate substitutions made in steps 1050 and 1060 where $\Delta z$ is calculated. However, the use of this equation to calculate thickness and (by repetition) depths is obviously more problematic than in the isotropic case (equation (34)). In principle, one could apply the stretch factor given above to velocities of a C-wave velocity function, but this requires independent estimates of the anisotropy factors $\delta_i$ and $\sigma_i$.

The previous results suggest several ways beyond those mentioned already in which the methods of the instant invention might be used to detect polar anisotropy. By way of one example, if depths calculated according to equation (33) do not match the depths as determined from P-wave velocities or the true depths from well logs, that fact suggests that anisotropy could be a problem. Additionally, if depth calculations according to equation (33) are less accurate than depth calculations via equation (37) (assuming that at least crude approximations are available for the parameters $\delta_i$ and $\sigma_i$), that suggests that polar anisotropy might be the problem. Other variations are certainly possible and have been contemplated by the instant inventor.

Using $\gamma_{\mathit{eff}}$ with Isotropic Computer Software

According to still another embodiment of the instant invention, a method is provided whereby it possible to use seismic processing software that assumes an isotropic and homogeneous subsurface model to process data collected from an anisotropic inhomogeneous medium, provided that the appropriate choice of processing parameters is made.

Those skilled in the art know that P-wave data are routinely processed without consideration of the effects of any underlying rock anisotropy; the anisotropy is hidden within the moveout velocity, and manifests itself first as time-to-depth mis-ties. If care is taken to avoid long spreads with non-hyperbolic moveout, and to do only informal AVO analysis, this approach can work quite nicely in practice.

However, in the C-wave seismic processing context, the conversion point must also be considered. It should be apparent from the previous discussion that the asymptotic conversion point $x_{c0}$ will be calculated properly by such an isotropic program, if the program is provided with $\gamma_{\mathit{eff}}$ as a velocity ratio to use in its calculation, assuming, of course, that the program does not defeat this stratagem by finding its own velocity ratio internally.

However, the departure of the actual conversion point from the ACP involves still other quantities. Write the coefficient $c_2$ which controls this departure, for an isotropic medium with velocity ratio $\gamma = \gamma_{\mathit{eff}} = \gamma_0$, as $$c_2^{iso}(\gamma_{\mathit{eff}}) = \frac{(\gamma_{\mathit{eff}} - 1)}{2(\gamma_{\mathit{eff}} + 1)}. \tag{38}$$

Then, the actual coefficient, equation (28), which is suitable for use in a many-layered anisotropic environment, may be written as $$c_2 = c_2^{iso}(\gamma_{\mathit{eff}}) \left[ \frac{\gamma_{\mathit{eff}}(\gamma_{\mathit{eff}}\gamma_0 - 1)(\gamma_0 + 1)}{\gamma_0(\gamma_{\mathit{eff}}^2 - 1)(\gamma_{\mathit{eff}} + 1)} \right] \tag{39}$$

From this equation, an informed judgment may be made about the degree of approximation involved in setting the factor in brackets above, i.e., $$\frac{\gamma_{\mathit{eff}}(\gamma_{\mathit{eff}}\gamma_0 - 1)(\gamma_0 + 1)}{\gamma_0(\gamma_{\mathit{eff}}^2 - 1)(\gamma_{\mathit{eff}} + 1)}$$

to unity, in any particular case. Thus, a numerical value for this factor may be calculated using the best "known" values of $\gamma_{\mathit{eff}}$ and $\gamma_0$, with the resulting quantity being compared to unity. To the extent that the calculated value is near 1.0, an assumption of isotropy will probably not be detrimental to the seismic processing steps that follow. On the other hand, values that are significantly different from unity should be marked for further investigation. That being said, it is likely that in many cases isotropy will prove to be an acceptable approximation. Where it is acceptable, this makes a substantial simplification to processing, since an isotropic code may be used by simply by supplying it with the proper value of the $\gamma_{\mathit{eff}}(z)$ function.

However, an isotropic program might calculate the conversion point by using instead the homogeneous isotropic equation (13) to determine the depths. The starting point for an analysis of this situation is the approximate equation (17) (which shows depth explicitly). That same equation may be used for layered anisotropic media, if $C_0$ as given by equation (27), $C_3$ as given by equation (18), and $$C_2 = \frac{\gamma_{\mathit{eff}}^2}{2\gamma_0} \frac{(\gamma_{\mathit{eff}}\gamma_0 - 1)}{(1 + \gamma_{\mathit{eff}})^4} \frac{(\overline{V}_p)^2}{V_{p2}^2} \tag{40}$$

are used. The isotropic coefficient in this case (corresponding to (38) in the time-domain case) is $$C_2^{iso}(\gamma_{\mathit{eff}}) = \frac{\gamma_{\mathit{eff}}}{2} \frac{(\gamma_{\mathit{eff}} - 1)}{(\gamma_{\mathit{eff}} + 1)^3}, \tag{41}$$

in terms of which the actual coefficient may be written $$C_2 = C_2^{iso}(\gamma_{\mathit{eff}}) \left[ \frac{\gamma_{\mathit{eff}}}{\gamma_0} \frac{(\gamma_{\mathit{eff}}\gamma_0 - 1)}{(\gamma_{\mathit{eff}}^2 - 1)} \right] \frac{(\overline{V}_p)^2}{V_{p2}^2} \tag{42}$$

Once again, equation (42) may be used to estimate whether such an isotropic program offers sufficient accuracy, in any particular case. Where the approximation is not a good one, i.e., where the calculated quantity $$\frac{\gamma_{\mathit{eff}}}{\gamma_0} \frac{(\gamma_{\mathit{eff}}\gamma_0 - 1)}{(\gamma_{\mathit{eff}}^2 - 1)} \frac{(\overline{V}_p)^2}{V_{p2}^2}$$

is significantly different from unity, then isotropic codes will likely lead to errors.

Finally, it should be reiterated here that there are many alternative arrangements and variations of each of the preceding equations that utilize two other independent parameters of the nine mentioned previously (i.e., $\gamma_{\mathit{eff}}$, $\gamma_0$, $\gamma_2$, $c_0$, $c_2$, $c_3$, $C_0$, $C_2$, $C_3$). That is, the equations in this section are aimed at detecting anisotropy through expressions involving the two parameters $\gamma_{\mathit{eff}}$ and $\gamma_0$. However, equivalent expressions may readily be developed which do not explicitly contain $\gamma_{\mathit{eff}}$ and $\gamma_0$, but instead are written in terms of, say, $c_0$ and $c_2$, this sort of reexpression being well within the ability of one normally skilled in the art. Thus, within this section—and elsewhere in this disclosure—equations involving $\gamma_{\mathit{eff}}$ and $\gamma_0$ should be considered as being only representative of the many alternative equivalent expressions that could be developed from other independent parameter pairs.

$\gamma_{\text{eff}}$ and Seismic Attribute/AVO Analysis

According to a further embodiment of the instant invention, a method is provided whereby it possible to use C-mode seismic data that has been processed by the instant methods in seismic attribute analyses. Broadly speaking, a seismic attribute is any measure of the seismic trace data that reduces its dimensionality or makes the seismic data easier to display and interpret. Scalar seismic attributes are generally preferred because they are more amenable to posting and mapping. By way of example, the peak value of a seismic reflector is a single value that provides information in a condensed form about an entire waveform, the length of which may be 25 or more digital samples. As is well known to those skilled in the art, there are an enormous number of seismic attributes that may be calculated from seismic data and additional attributes that can be calculated from the combined P and S data sets. Other examples of seismic attributes might include instantaneous frequency, instantaneous phase, instantaneous amplitude, window center frequency, peak amplitude, reflector length, frequency spectra, phase spectra, ratios and differences between different seismic attributes, etc.

AVO analyses can be broadly considered to be seismic attributes in the sense that they are derived from the raw seismic data and provide insight into subsurface properties not otherwise readily apparent. Because the C-mode seismic processing methods disclosed previously result in more accurate seismic imaging of the subsurface, the same processed seismic data should also provide a better subject matter upon which to apply conventional attribute analysis methods. Similarly, because the improved methods of forming CACP gathers discussed previously result in an "improved" unstacked gather, AVO analyses based on these gathers will be superior to those obtained from conventional seismic processing.

By way of general explanation, the broad goal of an AVO analysis is to make more easily visible to the explorationist offset-dependent reflectivity effects that may be found in some seismic data sets. Additionally, AVO provides an improved model of the reflection seismogram which may result in better estimates of both normal incidence reflection coefficients and "background" velocities. According to the conventional wisdom, the reflection and transmission coefficients at the top of a reflecting boundary are dependent on the angle at which the seismic signal strikes that boundary. This is true of all rock interfaces, but the reflections from some sorts of layers—e.g., gas filled sands—are especially sensitive to the angle at which the seismic energy strikes it (i.e., the "angle of incidence"). Thus, by examining changes in seismic amplitude versus incidence angle (or its surrogate, offset) it is sometimes possible to make statements about the subsurface lithology of a particular reflector that could not otherwise be obtained.

These effects can sometimes be identified visually by arranging the moved-out seismic traces from a single gather (or from a composite "super" gather that includes more than one conventional gather) in order of the offset of each trace from the shot and then visually comparing the amplitudes on the near traces with the amplitudes on the far traces at the same time point. (See, for example, page 25 of AVO Analysis: Tutorial & Review, cited previously). Related to this approach are various methods of calculating weighted stacks that emphasize AVO effects in the data. Other methods include various linear or nonlinear estimation techniques that calculate a slope or offset other parameter at each time point in a gather, which—when all of these parameters are collected—results in a single seismic "trace" that represents the AVO effects in that gather and consists of attribute values rather than seismic reflection amplitudes. These attribute or weighted stack traces are then usually combined to form a seismic attribute section or volume and then examined by the explorationist for evidence of AVO effects.

Thus, in the preferred embodiment, C-mode seismic data will be processed and moved-out according to the methods discussed previously using the then-best available estimates for $\gamma_{\text{eff}}$ and $\gamma_0$ (e.g., as illustrated in FIGS. 5 and/or 12), thereby producing a collection of C-mode CACP and CCP gathers. These gathers will then be used as input for AVO—or other seismic attribute—analysis.

If this is done with CACP gathers, then the amplitude at each offset is smeared across the reflector, as discussed above. So, in order to obtain AVO (or other) prestack attributes focused on a single subsurface point, the true CCP gather must first be constructed, as described previously. Without this step, the edges of AVO anomalies may be imprecisely located, which could result in the selection of a sub-optimal well location and could also yield low a volumetric estimate of the in-ground hydrocarbon reserves. As is well known to those skilled in the art, AVO analysis of a seismic gather preferably produces a single seismic trace as output, with the values of that trace being seismic attributes that are broadly indicative of the magnitude of any AVO effects present in the gather.

The particular elastic properties which govern the C-wave AVO attributes are given by Aki and Richards (1980). For purposes of the instant invention, it is sufficient to note that those properties are different than those which govern P-wave AVO effects, and so can yield different information about the rock unit interface. Hence, it should be clear to those skilled in the art that a multitude of combinations of the P-wave and C-wave AVO attributes may be constructed, each of which might potentially be responsive to a different aspect of the AVO effect.

Conclusions

In the previous discussion, the language has been couched in terms of operations performed on conventional seismic data from a multicomponent P-wave survey. But, it is understood by those skilled in the art that the invention herein described could be applied advantageously in other subject matter areas, and used to locate other subsurface minerals besides hydrocarbons. By way of additional examples, the same approach described herein could be used to process and/or analyze multicomponent data from cross-well and down-hole surveys, and model-based digital simulations of any of the foregoing. Additionally, the methods claimed hereinafter can be applied to transformed versions of these same seismic data traces including, for example: frequency domain Fourier transformed data; transformations by discrete orthonormal transforms; instantaneous phase, instantaneous frequency, the analytic and quadrature traces; etc. In short, the process disclosed herein can potentially be applied to any collection of geophysical time series that contains P and C-wave reflections, and mathematical transformations of same, but it is preferably applied to a collection of spatially related multicomponent time series containing structural and stratigraphic features. Thus, in the text that follows those skilled in the art will understand that "seismic trace" is used herein in a generic sense to apply to geophysical time series in general.

Additionally, although the language throughout this disclosure has focused on exploration for hydrocarbons, those skilled in the art will realize that the instant methods could also be used to advantage in the search for other sorts of subsurface mineral accumulations. Thus, the term hydrocarbon as it is used herein should be broadly interpreted to include any subsurface mineral deposit, whether carbon-based or not.

Further, in the previous text the starting point for many of the calculations was a CACP gather. However, those skilled in the art will recognize that this is not a requirement, but rather was done for purposes of convenience only. That is, one could instead perform the methods of the instant invention by starting with a gather which had some other aspect in common as, for example, a Common Target Conversion Point (CTCP) gather, i.e., a gather where the sources and receivers are selected so that they have in common the offset to the image point of a designated target horizon, rather than one at infinite depth. It would then be well within the ability of one skilled in the art to modify the previous disclosure to perform the methods disclosed herein beginning with the traces in a CTCP gather. Thus, in the text of this disclosure, unless otherwise specified, the term "CACP" is used in its broadest sense to include all of these gather variants, e.g., CACP, CCP, and CTCP. Additionally, it should be noted and remembered that a "gather" of seismic traces might contain only a single seismic trace, although typically it contains many more.

While the inventive device has been described and illustrated herein by reference to certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

REFERENCES

The documents that are listed below are specifically incorporated by reference into this patent application.

Aki, K. and P. Richards, 1980, QUANTITATIVE SEISMOLOGY, Freeman Press, N.Y.

Al-Chalabi, M, 1974, "An analysis of stacking, RMS, and interval velocities over a horizontally layered ground", Geophysical Prospecting, v. 22, No. 3, 458.

Alkhalifah, T. and I. Tsvankin, 1995, "Velocity analysis for transversely isotropic media", Geophysics, v. 60, no. 5, 1550–1566.

Claerbout, J. and Dellinger, J., 1987. "Eisner's reciprocity paradox and its resolution, The Leading Edge, v. 6, no. 10, 43–37.

Danbom, S. H., and Domenico, S. N., 1986. Shear-Wave Exploration: Geophysical Developments No. 1, Society of Exploration Geophysicists.

Dellinger, J. A., and, F. Muir, and M., 1993, Karrenbach, "Anelliptic approximations for TI media", Journal of Seismic Exploration, no. 2, 23–40.

Eaton, D., 1993. Processing of Converted-Wave Data from VTI media, Ph.D., thesis, Univ. Calgary.

Gaiser, J. E., 1997. "3-D Converted Shear Wave Rotation with Layer Stripping", U.S. Pat. No. 5,610,875.

Garotta, R., and Granger, P. Y., 1988. "Acquisition and processing of 3C×3D data using converted waves", Society of Exploration Geophysicists Expanded Abstracts, 58, S13.2.

Harrison, M., 1992, "Processing of P-SV Surface-Seismic Data: Anisotropy Analysis, Dip Moveout, and Migration", Ph. D. Thesis, U. Calgary, 229 pp.

Harrison, M., and R. Stewart, 1993. "Poststack migration of P-SV seismic data", Geophysics, v. 58, no. 8, 1127–1135.

Knopoff, L. and Gangi, A. A., 1959. "Seismic Reciprocity", Geophysics, v. 24, no. 4, 681–691.

Kommedal. J., O. Barkved, and L. Thomsen, 1997, "Acquisition of 4 component OBS data—a case study from the Valhall field", European Association of Geoscience Engineers Abstracts, 59.

Tessmer, G. and A. Behle, 1988, "Common Reflection Point Data-Stacking Technique for Converted Waves", Geophysical Prospecting, 36, 671–688.

Thomsen, L., 1988, "Reflection Seismology over Azimuthally Anisotropic Media", Geophysics, v. 51, no. 3, 3040313.

Thomsen, L., 1986, "Weak elastic anisotropy", Geophysics, v. 51 no. 10, 1954–1966.

Thomsen, L, O. Barkved, B. Haggard, J. Kommdeal, and B. Rosland, 1997a. "Converted-wave Imaging of Valhall Reservoir", European Association of Geoscience Engineers Expanded Abstracts, 59, B048.

Thomsen, L., Barkved, O., Haggard, B., Kommendal, J., and Rosland, B., 1997b. "A study of the dependence of OBS data-quality on seafloor equipment: dragged sled versus cable data, presented at Society of Exploration Geophysicists Annual Meeting; Research Workshop on 4C Applied Technology, Dallas, Tex.

Thomsen, L., Tsvankin, I., and Mueller, M. C., 1997c. "Coarse-layer stripping of shear-wave data for vertically variable azimuthal anisotropy", submitted to Geophysics.

Tsvankin, I and L. Thomsen, L, 1994, "Nonhyperbolic Reflection Moveout in Anisotropic Media, Geophysics, v. 59, no. 8, 1290–1304.

Yilmaz, Ozdogan, 1987. Seismic Data Processing, Society of Exploration Geophysicists.

What is claimed is:

1. A method of processing seismic data containing converted waves for use in seismic exploration, comprising:
   (a) accessing at least a portion of a multicomponent seismic survey collected over a predetermined volume of the earth, wherein
      (1) said predetermined volume of the earth contains structural or stratigraphic features conducive to the generation, migration, accumulation, or presence of hydrocarbons, and
      (2) said multicomponent seismic survey is comprised of seismic traces;
   (b) determining parameter estimates for at least two of $\gamma_{eff}$, $\gamma_0$, and $\gamma_2$ for at least one point in time, where $\gamma_{eff}$ is an effective velocity ratio, $\gamma_0$ is a vertical velocity ratio, and $\gamma_2$ is a moveout velocity ratio; and,
   (c) using at least one of said at least two parameter estimates to calculate at least one seismic gather from said seismic traces in said multicomponent seismic survey, thereby producing a representation of at least a portion of the predetermined volume of the earth for use in seismic exploration for said structural and stratigraphic features.

2. A method of processing seismic data containing converted waves according to claim 1, wherein said at least one calculated seismic gather of step (c) is a CACP gather.

3. A method of processing seismic data containing converted-waves according to claim 2, further comprising the step of:
   (d) forming at least one CCP gather from said at least one CACP gathers by using at least one of said at least two parameter estimates, thereby producing a representation of at least a portion of said predetermined volume of the earth for use in seismic exploration for said structural and stratigraphic features.

4. A method according to claim 3, further comprising the step of:
(e) calculating at least one seismic attribute from said at least one CCP gathers.

5. A method of processing seismic data containing converted waves according to claim 1, wherein said at least one calculated seismic gather of step (c) is a CCP gather.

6. A method of processing seismic data containing converted-waves according to claim 5, wherein step (b) includes the step of
(b1) determining estimated values for $\gamma_{eff}$ and at least one of $\gamma_0$ and $\gamma_2$, and, further comprising the steps of:
(d) using at least a portion of any of said CCP gathers so calculated to estimate a new value for at least $\gamma_{eff}$;
(e) using said new value of $\gamma_{eff}$ to calculate at least one CCP gather from said seismic traces in said multi-component seismic survey;
(f) performing steps (d) and (e) at least once; and,
(g) stacking at least a portion any CCP gathers produced from step (e), thereby forming an interpretable image for use in seismic exploration, the interpretable image being representative of at least a portion of said predetermined volume of the earth.

7. A method of processing seismic data containing converted-waves according to claim 1, further comprising the steps of:
(d) displaying at least a portion of said at least one seismic gather so formed.

8. A method of processing converted wave seismic data according to claim 1, further comprising the step of:
(d) stacking at least a portion of said at least one seismic gathers, thereby producing an image representative of at least a portion of said predetermined volume of the earth for use in seismic exploration.

9. A method of processing seismic data containing converted waves according to claim 1, further comprising the steps of:
(d) using at least a portion of said at least one seismic gathers to estimate a new value for at least one of said at least two parameter estimates, thereby producing at least one new parameter value;
(e) using any of said new parameter values so estimated to calculate at least one seismic gather from said seismic traces in said multicomponent seismic survey;
(f) performing steps (d) and (e) at least once; and,
(g) stacking at least a portion of said at least one seismic gathers, thereby forming an interpretable image for use in seismic exploration, said interpretable image being representative of at least a portion of said predetermined volume of the earth.

10. A method according to claim 1, further comprising the step of:
(d) calculating at least one seismic attribute from said at least one seismic gathers.

11. A method of processing seismic data containing converted-waves according to claim 10, wherein step (d) includes the steps:
(d1) performing an AVO analysis of at least a portion of said at least one seismic gathers, thereby producing at least one AVO analysis trace; and,
(d2) displaying at least a portion of said at least one AVO analysis traces, thereby creating a display for use in seismic exploration, said display being a representation of a least a portion of said predetermined volume of the earth.

12. A method of seismic processing according to claim 1, wherein step (b) includes the step of:
(b1) determining estimated values for at least two of $\gamma_{eff}$, $\gamma_0$, and $\gamma_2$ at a plurality of points in time.

13. A device adapted for use by a digital computer wherein a plurality of computer instructions defining the method of claim 1 are encoded,
said device being readable by said digital computer,
said computer instructions programming said digital computer to perform said method, and,
said device being selected from the group consisting of computer RAM, computer ROM, a PROM chip, flash RAM, a ROM card, a RAM card, a floppy disk, a magnetic disk, a magnetic tape, a magneto-optical disk, an optical disk, a CD-ROM disk, or a DVD disk.

14. A method of generating seismic attributes for use in the geophysical exploration for hydrocarbons, wherein there is provided a converted-wave survey collected over a predetermined volume of the earth, said converted-wave seismic survey containing P seismic traces and shear seismic traces, comprising the steps of:
(a) selecting at least two independent parameters of $\gamma_{eff}$, $\gamma_0$, $\gamma_2$, $c_0$, $c_2$, $c_3$, $C_0$, $C_2$, and $C_3$;
(b) obtaining estimated values for said selected independent parameters for at least one point in time, at least one of said estimated values being determined from at least a portion of said seismic traces in said converted wave survey; and,
(c) using said at least two independent parameter estimated values to form seismic attributes for use in the exploration of hydrocarbons within at least a portion of the predetermined volume of the earth.

15. A method according to claim 14, further comprising:
(d) displaying any seismic attributes so formed.

16. A method according to claim 14, wherein said selected independent parameters of step (a) include $\gamma_{eff}$ and $\gamma_0$.

17. A method according to claim 16, wherein step (b) includes the steps of:
(b1) accessing at least a portion of said converted wave survey,
(b2) using said accessed portion of said converted wave survey to determine an average compressional velocity and an average shear velocity for at least one point in time, and,
(b3) determining a value for $\gamma_0$ using said average compressional velocity and said average shear velocity.

18. A method according to claim 16, wherein step (c) includes the step of:
(c1) examining any $\gamma_{eff}$ and $\gamma_0$ parameter values so estimated for evidence of anisotropy within said predetermined volume of the earth.

19. A method according to claim 18, wherein step (c1) includes the steps of:
(i) selecting one estimated value of $\gamma_{eff}$ and one estimated value of $\gamma_0$ calculated at approximately a same time point, and,
(ii) determining that anisotropy is not indicated within at least a portion of said predetermined volume of the earth if said estimated values of $\gamma_{eff}$ and $\gamma_0$ are approximately a same size, and, otherwise determining that there is some evidence of anisotropy within said at least a portion of said predetermined volume of the earth.

20. A method according to claim 18, wherein step (c1) includes the steps of:
(i) selecting one estimated value of $\gamma_{eff}$ and one estimated value of $\gamma_0$ calculated at approximately a same time point, (ii) calculating a quantity equal to $$\frac{\gamma_{\it eff}(\gamma_{\it eff}\gamma_0-1)(\gamma_0+1)}{\gamma_0(\gamma_{\it eff}^2-1)(\gamma_{\it eff}+1)},$$

and, (iii) determining that anisotropy is not indicated within at least a portion of said predetermined volume of the earth if said calculated quantity is approximately equal to unity, else, determining that there is some evidence of anisotropy within said at least a portion of said predetermined volume of the earth if said calculated quantity is different from unity.

21. A method according to claim 18, wherein step (c1) includes the steps of:
   (i) selecting one estimated value of $\gamma_{\it eff}$ and one estimated value of $\gamma_0$ calculated at approximately a same time point,
   (ii) calculating a quantity equal to $$\frac{\gamma_{\it eff}}{\gamma_0}\frac{(\gamma_{\it eff}\gamma_0-1)}{(\gamma_{\it eff}^2-1)}\frac{(\overline{V}_p)^2}{V_{p2}^2},$$

where $V_{p2}^2$ is an average interval compressional velocity at approximately said same time point, and $\overline{V}_p$ is an average compressional velocity down to approximately said same time point, and (iii) determining that anisotropy is not indicated within said predetermined volume of the earth if said calculated quantity is approximately equal to unity, else, determining that there is some evidence of anisotropy within said predetermined volume of the earth if said calculated quantity is not approximately equal to unity.

22. A device adapted for use by a digital computer wherein a plurality of computer instructions defining the method of claim 14 are encoded,
   said device being readable by said digital computer,
   said computer instructions programming said digital computer to perform said method, and,
   said device being selected from the group consisting of computer RAM, computer ROM, a PROM chip, flash RAM, a ROM card, a RAM card, a floppy disk, a magnetic disk, a magnetic tape, a magneto-optical disk, an optical disk, a CD-ROM disk, or a DVD disk.

23. A method of choosing parameters for use in a multi-component survey collected over a predetermined volume of the earth, wherein is provided a region of interest on the surface of the earth above at least a portion of said predetermined volume, comprising the steps of:
   (a) determining a survey geometry for said multicomponent survey;
   (b) selecting a location within said region of interest;
   (c) selecting at least two independent parameters of $\gamma_{\it eff}$, $\gamma_0$, $\gamma_2$, $c_0$, $c_2$, $c_3$, $C_0$, $C_2$, and $C_3$;
   (d) determining estimated parameter values for said selected independent parameters for at least one point in time at said selected location;
   (e) performing steps (c) and (d) a predetermined number of times;
   (f) calculating a CTCP fold for at least one particular location within said region of interest using said survey geometry and any estimated parameter values so determined; and,
   (g) displaying at least a portion of any of said CTCP folds so calculated, thereby producing a diagnostic display for use in seismic exploration.

24. A device adapted for use by a digital computer wherein a plurality of computer instructions defining the method of claim 23 are encoded,
   said device being readable by said digital computer,
   said computer instructions programming said digital computer to perform said method, and,
   said device being selected from the group consisting of computer RAM, computer ROM, a PROM chip, flash RAM, a ROM card, a RAM card, a floppy disk, a magnetic disk, a magnetic tape, a magneto-optical disk, an optical disk, a CD-ROM disk, or a DVD disk.

25. A method of determining a depth within the subsurface of the earth corresponding to a seismic travel time, wherein is provided
   at least one converted wave RMS velocity, each of said at least one converted wave RMS velocities being defined over a time interval, said time interval extending from a first travel time to a second travel time,
   at least one subsurface vertical velocity ratio, each of said at least one converted wave RMS velocities corresponding to one of said converted wave RMS velocities,
   comprising the steps of:
      (a) selecting a converted wave RMS velocity from said at least one converted wave RMS velocities, said selected converted wave RMS velocity being defined over a particular time interval, said particular time interval being defined by a particular first travel time, and a particular second travel time;
      (b) selecting a corresponding vertical velocity ratio;
      (c) calculating an incremental depth value from said particular converted wave RMS velocity, said particular time interval, and said selected corresponding vertical velocity ratio;
      (d) performing steps (a) to (c) a predetermined number of times, thereby producing a predetermined number of incremental depth values; and,
      (e) calculating said depth within said subsurface of the earth from any of said predetermined number of incremental depth values so calculated.

26. A method according to claim 25, wherein step (c) is performed by solving the equation $$\Delta z_i = V_{ci}\Delta t_{cOi}\frac{\sqrt{\gamma_{0i}}}{1+\gamma_{0i}},$$

for $\Delta z_i$, where $\Delta z_i$ is said incremental depth value, $V_{ci}$ is said selected converted wave RMS velocity, $\gamma_{0i}$ is said corresponding vertical velocity ratio, and $\Delta t_{cOi}$ is said particular time interval associated with said selected converted wave RMS velocity.

27. A method according to claim 25,
   wherein is additionally provided a P-wave RMS velocity associated with each of said at least one converted wave RMS velocities, and wherein step (c) includes the following steps:
      (c1) selecting a P-wave RMS velocity associated with said selected converted wave RMS velocity,
      (c2) solving $$\Delta z_i = V_{pi}\Delta t_{cOi}/(1+\gamma_{0i})$$

for $\Delta z_i$, where $\Delta z_i$ is said incremental depth value, $V_{pi}$ is said selected P-wave RMS velocity, $\gamma_{0i}$ is said corresponding vertical velocity ratio, and $\Delta t_{c0i}$ is said selected time interval associated with said selected converted wave RMS velocity.

28. A device adapted for use by a digital computer wherein a plurality of computer instructions defining the method of claim 25 are encoded, said device being readable by said digital computer, said computer instructions programming said digital computer to perform said method, and, said device being selected from the group consisting of computer RAM, computer ROM, a PROM chip, flash RAM, a ROM card, a RAM card, a floppy disk, a magnetic disk, a magnetic tape, a magneto-optical disk, an optical disk, a CD-ROM disk, or a DVD disk.

29. A method of processing seismic data containing converted waves for use in seismic exploration, comprising:

(a) accessing at least a portion of a multicomponent seismic survey collected over a predetermined volume of the earth, wherein
  (1) said predetermined volume of the earth contains structural or stratigraphic features conducive to the generation, migration, accumulation, or presence of hydrocarbons, and
  (2) said multicomponent seismic survey is comprised of seismic traces;

(b) determining estimated values for at least two independent parameters of $\gamma_{\mathit{eff}}$, $\gamma_0$, $\gamma_2$, $c_0$, $c_2$, $c_3$, $C_0$, $C_2$, and $C_3$, for at least one point in time; and, (c) using at least one of said at least two parameters to calculate at least one seismic gather from said seismic traces in said multicomponent seismic survey, thereby producing a representation of at least a portion of the predetermined volume of the earth for use in seismic exploration for said structural and stratigraphic features.

30. A method according to claim 29, wherein said calculated seismic gather is a CTCP gather.

31. A method of processing seismic data containing converted-waves according to claim 29, further comprising the step of:

(d) forming at least one CCP gather from said at least one CTCP gathers by using at least one of said parameter estimates, thereby producing a representation of at least a portion of said predetermined volume of the earth for use in seismic exploration for said structural and stratigraphic features.

32. A method according to claim 29, wherein, $$c_0 = \frac{1}{1 + 1/\gamma_{\mathit{eff}}}, \qquad (41)$$

$$c_2 = \frac{\gamma_{\mathit{eff}}}{2\gamma_0}(\gamma_{\mathit{eff}}\gamma_0 - 1)\frac{(1+\gamma_0)}{(1+\gamma_{\mathit{eff}})^3}, \text{ and}$$

$$c_3 = c_2/(1 - c_0).$$

33. A method according to claim 29, wherein, $$C_0 = \frac{1}{1 + 1/\gamma_{\mathit{eff}}},$$

$$C_2(\gamma) = \frac{\gamma_{\mathit{eff}}}{2}\frac{(\gamma_{\mathit{eff}} - 1)}{(\gamma_{\mathit{eff}} + 1)^3}, \text{ and}$$

$$C_3 = C_2/(1 - C_0).$$

34. A method according to claim 29, wherein, $\gamma_0 = \tilde{V}_P/\tilde{V}_S$, $\gamma_2 = V_{p2}/V_{s2}$, and, $\gamma_{\mathit{eff}} = \gamma_2^2/\gamma_0$.

35. A device adapted for use by a digital computer wherein a plurality of computer instructions defining the method of claim 29 are encoded, said device being readable by said digital computer, said computer instructions programming said digital computer to perform said method, and, said device being selected from the group consisting of computer RAM, computer ROM, a PROM chip, flash RAM, a ROM card, a RAM card, a floppy disk, a magnetic disk, a magnetic tape, a magneto-optical disk, an optical disk, a CD-ROM disk, or a DVD disk.

* * * * *

UNITED STATES PATENT AND TRADEMARK OFFICE
CERTIFICATE OF CORRECTION

PATENT NO.     : 6,128,580
DATED          : October 3, 2000
INVENTOR(S)    : Leon Thomsen It is certified that error appears in the above-identified patent and that said Letters Patent is hereby corrected as shown below:

Column 4,
Line 63, "substantially as desribed above," should read: -- substantially as described above, --

Column 10,
Line 8, "$A_4 x^4 +$" should read: -- "$A_4 x^4 + \ldots$" --

Column 23,
Line 65, "to Detect Polor Anisotropy" should read -- to Detect Polar Anisotropy --

Column 28,
Lines 24 and 25, "yield low a volumetric" should read: -- yield a low volumetric --

Column 30,
Line 16, "Thomsen, L.O. Barkved," should read: -- Thomsen, L., O. Barkved, --

Column 31,
Line 15, "for at least $y_{eff}..$" should read: -- for at least $y_{eff}.$"

Line 20, "at least a portion any" should read: -- at least a portion of any --
Line 27, "the steps of:" should read: -- the step of: --

Column 33,
Line 50, "wherein is provided a" should read: -- wherein there is provided a --

Column 34,
Line 57, "wherein is additionally" should read: -- wherein there is additionally --

UNITED STATES PATENT AND TRADEMARK OFFICE
CERTIFICATE OF CORRECTION

PATENT NO.    : 6,128,580
DATED         : October 3, 2000
INVENTOR(S)   : Leon Thomsen It is certified that error appears in the above-identified patent and that said Letters Patent is hereby corrected as shown below:

Column 36,
Line 9, $$" c_2 = \frac{\gamma_{eff}}{2\gamma_0} (\gamma_{eff}\gamma_0 - 1) \frac{(1+\gamma_0)}{(1+\gamma_{eff})^3} ,"$$

should read:

$$" c_2 = \frac{\gamma_{eff}}{2\gamma_0} \frac{(\gamma_{eff}\gamma_0 - 1)(1+\gamma_0)}{(1+\gamma_{eff})^3} ,"$$

Column 15,
Lines 2-4, $$" X \left[ c_0 + \frac{c_2 \left(\frac{X}{t_{c0}V_c^2}\right)^2}{\left(1 + c_3 (X/t_{c0}V_c^2)^2\right)} \right] "$$

should read:

$$" X \left[ c_0 + c_2 \frac{\left(\frac{X}{t_{c0}V_c^2}\right)^2}{\left(1 + c_3 (X/t_{c0}V_c^2)^2\right)} \right] "$$

UNITED STATES PATENT AND TRADEMARK OFFICE
CERTIFICATE OF CORRECTION

PATENT NO. : 6,128,580
DATED : October 3, 2000
INVENTOR(S) : Leon Thomsen

It is certified that error appears in the above-identified patent and that said Letters Patent is hereby corrected as shown below:

Column 15,
Lines 10 and 11, $$c_2 = \frac{y_{eff}}{2y_0} (y_{eff} y_0 - 1) \frac{(1+y_0)}{(1+y_{eff})^3},$$

should read:

$$c_2 = \frac{y_{eff}}{2y_0} \frac{(y_{eff} y_0 - 1)(1+y_0)}{(1+y_{eff})^3},$$

Column 24,
Lines 60 and 61, $$y_{ci} = \frac{y_{0i}(1+2\delta_i)}{(1+2\sigma_i)}$$

should read:

$$y_{ci} = y_{0i} \frac{(1+2\delta_i)}{(1+2\sigma_i)}$$

UNITED STATES PATENT AND TRADEMARK OFFICE
CERTIFICATE OF CORRECTION

PATENT NO. : 6,128,580
DATED : October 3, 2000
INVENTOR(S) : Leon Thomsen

It is certified that error appears in the above-identified patent and that said Letters Patent is hereby corrected as shown below:

Column 12,
Lines 44 and 45, $$" X_c(X,z) \approx \left[ C_0 + \frac{C_2(X/z)^2}{(1+C_3(X/z)^2)} \right] "$$

should read:

$$" X_c(X,z) \approx X \left[ C_0 + C_2 \frac{(X/z)^2}{(1+C_3(X/z)^2)} \right] "$$

Signed and Sealed this

Twelfth Day of February, 2002

*Attest:*

JAMES E. ROGAN
*Attesting Officer*     *Director of the United States Patent and Trademark Office*